(12) United States Patent
McConnell

(10) Patent No.: US 10,486,900 B2
(45) Date of Patent: Nov. 26, 2019

(54) SYSTEM AND APPARATUS FOR WASTE DISPOSAL AND CHANGING INFANT-TODDLER BEHAVIOR

(71) Applicant: 1316 LLC, Las Vegas, NV (US)

(72) Inventor: Thomas E. McConnell, Santa Maria, CA (US)

(73) Assignee: 1316 LLC, Las Vegas, NV (US)

( * ) Notice: Subject to any disclaimer, the term of this patent is extended or adjusted under 35 U.S.C. 154(b) by 0 days.

(21) Appl. No.: 15/374,996

(22) Filed: Dec. 9, 2016

(65) Prior Publication Data

US 2017/0081116 A1  Mar. 23, 2017

Related U.S. Application Data

(63) Continuation-in-part of application No. 14/838,267, filed on Aug. 27, 2015, now Pat. No. 9,555,963, which is a continuation-in-part of application No. 14/838,247, filed on Aug. 27, 2015, now Pat. No. 9,969,550.

(51) Int. Cl.
*B65F 1/04* (2006.01)
*B65F 1/06* (2006.01)
*B65F 1/14* (2006.01)
*B65F 1/16* (2006.01)
*G09B 19/00* (2006.01)

(52) U.S. Cl.
CPC ............. *B65F 1/06* (2013.01); *B65F 1/1426* (2013.01); *B65F 1/163* (2013.01); *B65F 1/1646* (2013.01); *G09B 19/0076* (2013.01); *B65F 2210/129* (2013.01); *B65F 2240/132* (2013.01)

(58) Field of Classification Search
CPC .......... B65F 1/06; B65F 1/1426; B65F 1/163; B65F 1/1646; B65F 2210/129; B65F 2240/132
USPC ........ 220/495.06, 495.08, 908, 908.1, 908.2, 220/908.3, 495.011, 495.05, 495.11
See application file for complete search history.

(56) References Cited

U.S. PATENT DOCUMENTS

| | | | |
|---|---|---|---|
| 3,321,103 A | 5/1967 | Phillips | |
| 5,125,526 A * | 6/1992 | Sumanis | B65F 1/06 220/263 |
| 7,516,865 B1 * | 4/2009 | Pierre | B65F 7/00 220/87.1 |
| 8,266,870 B1 | 9/2012 | Stravitz | |
| 8,505,769 B2 * | 8/2013 | Finnestad | A61B 50/36 206/366 |
| 2008/0019618 A1 | 1/2008 | Dayton et al. | |
| 2009/0126320 A1 * | 5/2009 | Rousso | B29C 66/4312 53/459 |

* cited by examiner

*Primary Examiner* — Andrew T Kirsch
*Assistant Examiner* — Elizabeth J Volz
(74) *Attorney, Agent, or Firm* — WPAT, P.C., Intellectual Property Attorneys; Anthony King

(57) ABSTRACT

A waste disposal system having an isolated top chamber with a guiding structure, a chute, or a pair of parabolic top door members to guide a falling object to fall towards a center vertical axis of the waste disposal system.

27 Claims, 40 Drawing Sheets

SYSTEM AND APPARATUS FOR WASTE DISPOSAL AND CHANGING INFANT-TODDLER BEHAVIOR

CROSS-REFERENCE TO RELATED APPLICATIONS

This application claims priority to, and is a continuation-in-part of, U.S. patent application Ser. No. 14/828,267 (now allowed), which is a continuation-in-part of application Ser. No. 14/838,247, which is also a continuation-in part of application Ser. No. 14/473,776, which in turn is a continuation-in-part of U.S. Pat. No. 9,434,537 (now allowed), all of which are hereby incorporated by reference in their entirety.

BACKGROUND OF THE DISCLOSURE (1) Field of the Invention

The field of the invention relates to disposal systems of malodorous waste packages, namely dirty diapers, while also positively reinforcing infant-toddler behavior and child development.

(2) Description of Related Art Including Information Disclosed Under 37 CFR 1.97 and 1.98

Dirty diapers and/or other waste items can generate unpleasant odors, especially over extended time periods. Consequently, placing such waste items in a waste container that does not provide adequate sealing can result in the undesirable result of having odors escape into the surrounding environment.

At present, there are numerous diaper disposal pails on the market; however, none are entirely satisfactory. Presently, diaper pails on the market simply have tops that cover a container housing the dirty diapers, yet such tops are not hands-free, requiring a user to grasp a handle, a latch, or the like to open the container in order to dispose of the diaper. Accordingly, such diaper pails serve as adequate disposal containers, yet are still unable to contain or mask the stench of dirty diapers because upon opening the diaper pail top, the stench will almost certainly be let out of the container. Some diaper pails have add-on products such as carbon filters and baking soda cartridges to absorb or neutralize odors, which may not be completely effective given that the bags within the diaper pails are not sealed off to prevent odors from escaping once the top of the diaper pail is open.

Other diaper pails such as U.S. Pat. No. 8,127,519, which is incorporated herein by reference in its entirety, have flexible material separating the main body cavity of the pail from an upper portion of the pail. However, such diaper pails still do not afford hands-free disposal and require the user to forcefully push the diaper by hand through the flexible webbing into the main body cavity of the pail. Even more, although there may be a twisting mechanism in efforts to contort and seal off a neck of the bag, the flexibility of the material does not create a tight seal thereby leaving gaps allowing odors to escape through the bag opening.

Another receptacle such as that illustrated in U.S. Pat. No. 5,125,526, which is incorporated herein by reference in its entirety, discloses a receptacle with a rotatably mounted holder. In response to movement of a foot pedal, the holder rotates opening and closing the bag. While an upper portion of the bag is fixed to the receptacle, a lower portion of the bag is adhered to the holder using a double-sided adhesive tape so that the bag rotates with the holder. However, this receptacle has its disadvantages; in particular, the bag maintains its twisted formation only when the top is closed. Upon pressing down the foot pedal, the top opens, the holder rotates, and the bag opens causing the unpleasant odors to flow out of the open bag. Since the bag is only twisted closed when top of the receptacle is closed; once the top is opened, the bag will also open and thus emit undesirable odors. Furthermore, the double-sided adhesive tape which adheres the bag to the holder, typically incurs additional drawbacks. One of ordinary skill in the art would recognize that the double-sided adhesive tape must be of sufficient strength to adhere to the holder such that the point of adherence to the holder will not peel off when the holder rotates; however, due in part to the force of the rotation of the holder, the double-sided adhesive tape on the conventional plastic bag may end up distorting and stretching the plastic, and creating holes in the bag, particularly around where the tape is adhered.

Accordingly, there is a continuing need for an improved diaper pail or waste container having a hands-free or touch-free means for enhanced confinement of malodorous waste objects deposited into a container thereby retaining and preventing offensive odors from being emitted from the waste container. In other words, the waste disposal system would feature a means of depositing waste into a container while maintaining the bag in a closed formation for at least the duration of time that the top is open so that the user would not have to risk inhaling undesirable odors and other particles.

Additionally, existing diaper disposal pails typically serve as an object for which users, typically adults, only use to dispose of the diapers. Typically, a waste receptacle does not serve as a decorative or visually stimulating article in the room. In other words, the waste receptacle is typically not an article of interest or stimulation for infants and toddlers. A visually stimulating diaper pail could serve to reinforce infant-toddler behavior and enable infants and toddlers to alert parents for diaper-change as they would be excited to view the visually stimulating event that accompanies diaper disposal. It can be further appreciated that a desirable waste disposal system also further serves as a visually stimulating system that also positively reinforces infant-toddler behavior and assists in child development.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE DISCLOSURE

Improved embodiments of a diaper pail or waste disposal system which serves as a system for positive reinforcement of infant-toddler behavior and child development are hereby disclosed. The general concept is to provide a diaper pail or waste receptacle that comprises a feature such that a user may dispose of malodorous waste without the risk of inhaling unpleasant odors.

In some embodiments the waste disposal system features a top having at least one door such that when a waste material is dropped or tossed through the door of the top, the disposable bag within the receptacle maintains a closed formation; after the door is closed, upon user actuation, the disposable bag can temporarily open for the dirty diaper to drop into the bag's main cavity, and then the bag can return to its closed formation. Accordingly, the movement of the door of the top can be independent of a change in the open or closed formation of the disposable bag.

In further contemplated embodiments, waste disposal system features at least one attachment mechanism within an inner barrel of the waste receptacle. The attachment mechanism is a hook, a peg, or a clip to which a disposable bag has a receiver to make a detachable coupling with the attachment mechanism. In some embodiments, the receiver of the disposable bag is at least one of a hole, a sleeve, a string, a loop, a strap, or a reinforced tab.

Among the many different possibilities contemplated, an embodiment of a closed formation of the disposable bag can be wherein a neck of the bag is twisted. In the alternative, the neck of the bag can be rolled. In yet another embodiment, the neck of the bag can be clamped. For example, the closed formation can be produced via movement of a lower body of the bag relative to the upper portion i.e., a neck of the bag. One of ordinary skill in the art would immediately recognize that there are many other known mechanisms for the purpose of situating a disposable bag in a closed formation. Further, in certain embodiments, the user actuated mechanism that temporarily opens the bag is via a foot pedal. In the alternative, the user actuated mechanism can be a motion sensor. In yet another embodiment, the mechanism can be via a button or a handle. In another alternative embodiment, the user actuated mechanism can be a weight sensor.

In yet another embodiment, a waste disposal system can have a container assembly with a base, an outer casing, an inner barrel with an inner volume, where the inner barrel is disposed inside of the outer casing. The container assembly can also include a top chamber with at least one door member at the top of the chamber and a guiding structure. The guiding structure can be located within the top chamber, and can have a downward sloping surface with a lower rim defining a through hole. The guiding structure may have one or more perforations. This guiding structure can be attached to the container assembly by either snapping it on certain part (e.g., on the collar or within the top chamber) of the container assembly, twisting it on certain part (e.g., on the collar or within the top chamber) of the container assembly or screwing it on that assembly (e.g., on the collar or within the top chamber).

In some embodiments, the guiding structure can include multiple parts such as a base, and a cover attachable to the base. The guiding structure can be hollow and can contain compartments where a user can add a deodorizing or scented element within the guiding structure. In other embodiments, the waste disposal system can have a chute. The chute can be located at the top of the container assembly or inside the top chamber. In some embodiments, this chute can or cannot co-exist with the guiding structure.

Various shapes are contemplated for the chute, for example, cylindrical and frusto-conical.

In another embodiment, the top chamber may have one or more door members. These door members can also have spring members attached to them to ensure that the door members are biased close. The pivoting door members can also have a lower portion positioned lower than outer portions of the pivoting door members when the members are closed. In other embodiments, the pivoting door members can form a parabolic shape in a downward direction when the two pivoting door members are in a closed position. In some embodiments, the pivoting door members can separately pivot from each other and pivot open in a downward direction when an object is disposed on the at least two pivoting door members.

In other embodiments, the pivoting door members can form a downward slope toward a center of the door such that when an object is placed on top of any of the two pivoting door members when the door members are in an open position, the object is guided towards the center by gravity.

In yet other embodiments, the pivoting door members can form a downward slope toward a center of the door such that when an object is placed on top of any of the two pivoting door members when the door members are in a closed position, the object is guided towards the center by gravity.

In yet another embodiment, the waste disposal system can have one or more guiding walls inside the top chamber or anywhere inside the container. The guiding walls may in certain embodiments form a funnel shape passage, a cylindrical shape passage or any other polygonal shaped passage which can or cannot facilitate the sliding of objects down the container.

In other embodiments, the waste disposal system can contain an enclosure to hold waste material, a container assembly to contain the enclosure. The container assembly can have an isolated top chamber disposed above the enclosure, and the isolated top chamber can have a top door. The waste assembly may also comprise an actuator to control an opening and a closing to an entrance to the enclosure independent of the opening and closing of the top door. The isolated chamber can have a casing made of transparent or a semi-transparent material. The top door members of the top chamber can also be transparent, semi-transparent, or translucent.

The contemplated systems may be particularly useful in nurseries, daycare centers, and other places that handle particularly malodorous waste such as dirty diapers. Using this hands-free and touch-free system, a user can now dispose of malodorous diapers and waste products without the risk of inhaling unpleasant odors.

Another aspect of the disclosure is directed to a visually stimulating waste disposal system directed to positively reinforcing infant-toddler behavior. It is commonly known that the right visual stimulation helps with a child's brain development. In a certain embodiment, the waste receptacle can feature a transparent outer barrel casing and an inner barrel with a bright, colorful exterior. Further contemplated exteriors can feature stop-motion animation so that upon user actuation, the receptacle features animated movements to further entice the attention of infants and toddlers. It is still further contemplated that the different exteriors of the inner barrel can be interchangeable for continued stimulation during a child's growth and development. Further, the enticing exteriors and the subsequent animation of the moving inner barrel can attract and positively train children to alert parents for diaper changing. Concurrently, the bright colors, designs, and visually stimulating images can further help stimulate a child's vision and brain development.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

FIG. 9D is a perspective view of the base of FIG. 9A, where a ball bearing is fitted around the axle, yet still allowing the rotating axle to extend there through.

FIG. 17 is a perspective view of an embodiment of a diaper pail having a transparent top chamber, a transparent outer barrel and a guiding structure.

DETAILED DESCRIPTION OF THE DISCLOSURE

Figure 1A:
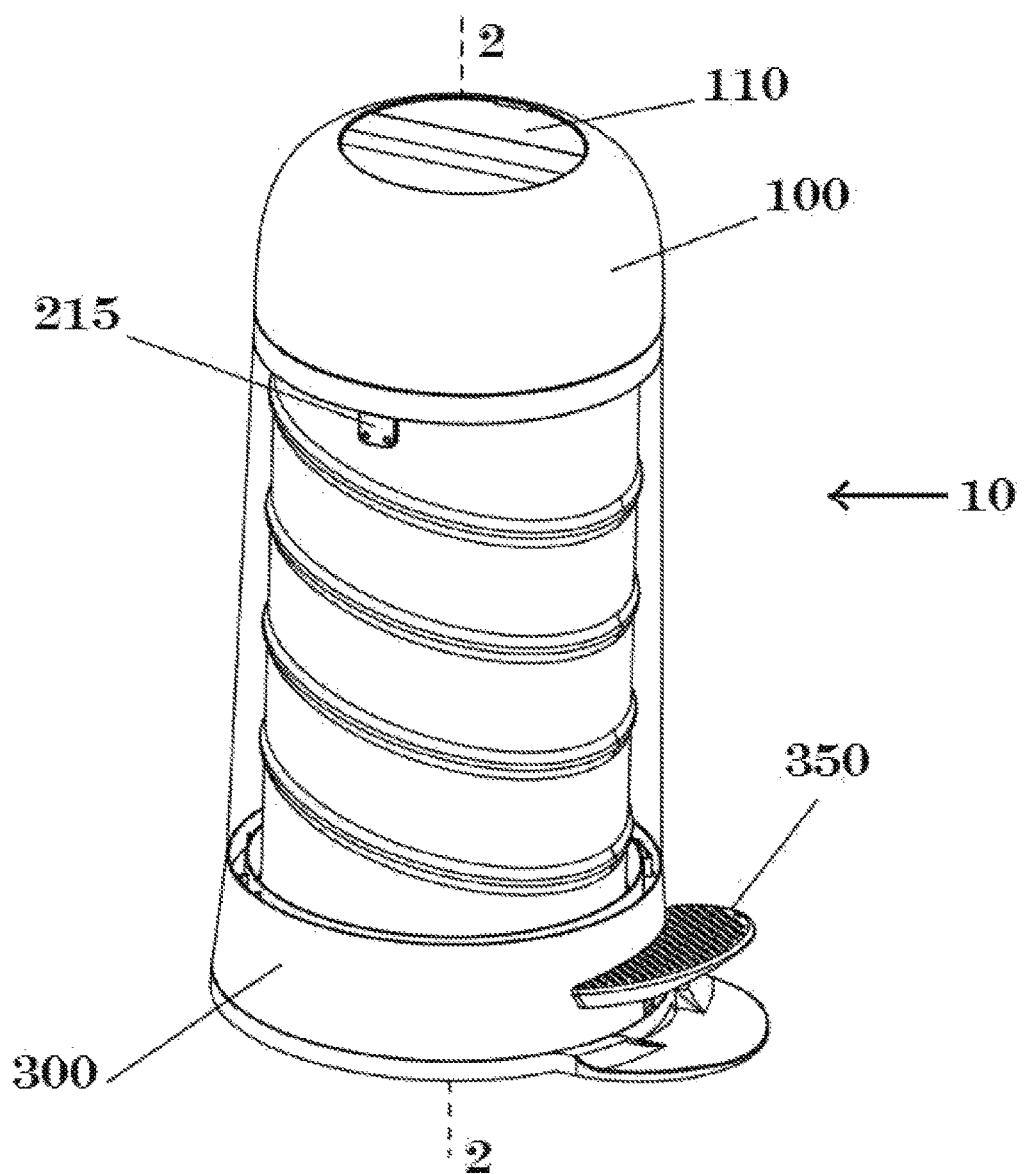
FIG. 1A is a perspective view of an embodiment of a diaper pail having a transparent outer barrel.

The disclosure and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Many alterations and modifications may be made by those having ordinary skill in the art without departing from the spirit and scope of the disclosure. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

The term door refers to an entry way, an ingress, or an egress. The term door member refers to generally known structures to block the entry way. Example of such structures includes panels, covers, shutter-type blades. Contemplated door members can be selectively operated by a user. Door members are not limited to those that pivot on a hinge. The door members can come in various forms, such as those shown and discussed above. In other alternative embodiments, door members can be shutter blades similar to those seen in cameras. Shutter blades can be operated and driven mechanically or electronically. No matter which form of door member is implemented, the door members can be operated manually (e.g., via a button or lever), or operated/controlled electronically via sensors (e.g., weight sensor, motion sensor, light sensor). In some embodiments, the door or doors can be driven by a motor. In further embodiments, the door or doors can be controlled by a remote controller via wire or wirelessly.

FIG. 1A generally depicts one embodiment of a diaper pail or container assembly 10. In FIG. 1A, the container assembly 10 is shown having a base 300 with a pedal 350 protruding out of the base 300. Coupled to the base 300 can be an inner barrel 210 having an inner volume and an outer barrel casing 200 enclosing/encasing the outer circumference of the inner barrel 210. In some embodiments, there is sufficient clearance between the inner barrel and the outer barrel, so that the inner barrel can freely rotate without touching the outer barrel. The inner barrel 210 shown can have some kind of spiral blade on its outside surface, this spiral blade does not aid in driving or rotating the inner barrel 210. This spiral blade does not interact or engage with the outer barrel 200. The illustrated spiral blade is one of the contemplated designs on the inner barrel 210 to create visual stimulation. In the depicted embodiment, the outer barrel casing 210 can be transparent, and the inner barrel casing 210 can be seen through the transparent outer barrel casing 200, as the inner barrel casing 210 rotates. Other contemplated embodiments may feature designs on the outer barrel casing 200. Yet other contemplated embodiments can feature a partly opaque outer barrel casing 200. Yet another contemplated embodiment can feature a completely opaque outer barrel casing 200. In the upper region of the container assembly 10 can be a top 100 having two pivoting door members 110. In other embodiments, the top can have at least one pivoting door member. In other embodiments, the top does not have a pivoting door member. In the depicted embodiment, the inner barrel 210 can have at least one attachment mechanism 215 on the inner barrel.

Although the word barrel usually describes a tubular object having a circular cross-sectional shape, it is specifically noted here that the word barrel in the specification has no specific limitation or restriction on its cross-sectional shape.

Figure 1B:
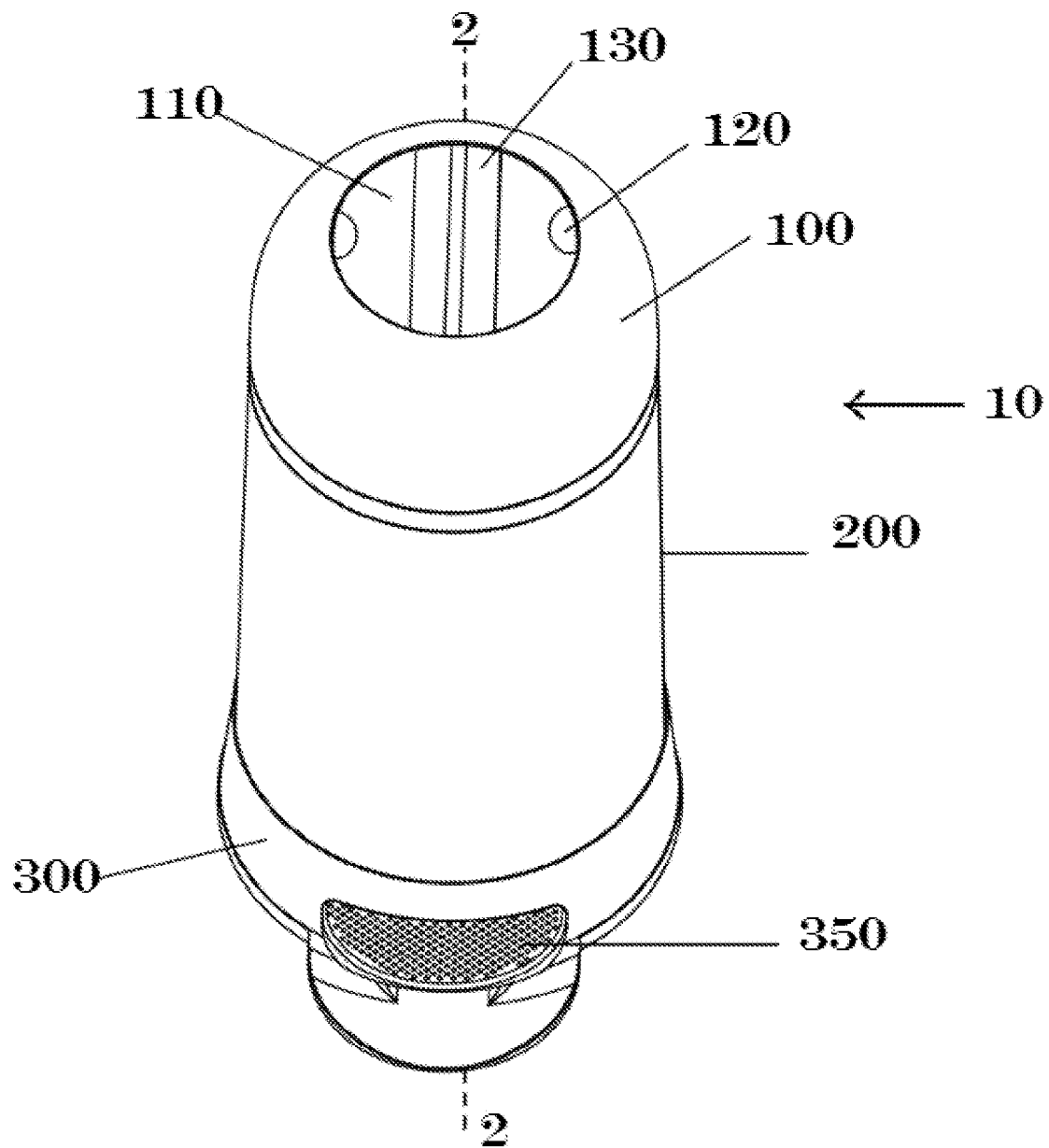
FIG. 1B is a top angled perspective view of the diaper pail of FIG. 1A (the outer barrel is not shown to be transparent, for easier illustration).

FIG. 1B shows another view of the diaper pail or container assembly 10 looking downwards through the two pivoting transparent door members 110 (closed as shown) into the inner space of the container assembly 10. The door members 110 are coupled to the top 100 with a resilient piece 120. The resilient piece 120 is sufficiently strong to bias the door members 110 shut, yet allows for the door members 110 to swing open in a downward direction when a dirty diaper falls onto the door members 110, thereby allowing the dirty diaper to fall through the door members 110. After the waste is passed through the door members 110, the door members 110 swing shut. In contemplated embodiments, the resilient piece 120 is made of silicone. In other embodiments, the resilient piece is 120 made of a resilient material such as rubber. In further contemplated embodiments, the resilient piece 120 is a leave spring or coil spring.

The shown embodiment further shows a seal 130 between the two door members 110. In keeping with its designated term, the seal 130 serves to seal the two door members 110 when they overlap, to retain and prevent odors from seeping out. In contemplated embodiments, the seal 130 is a long flexible strap made of a material such as rubber, silicone, and the like . . . to attach to one, or both door members 110 at their far ends away from the resilient piece 120. The purpose of the seal 130 is to form a secure temporary substantial airtight closure when the two doors 110 close on each other. In this way, the flexible seal 130 of one door member overlaps with the flexible seal 130 of other door member, making a tight seal. In an embodiment where each door 110 has a seal 130, the two flexible seal 130 would overlaps each other when the doors 110 are closed, making a tight seal. In other embodiments, the door members 110 do not have a seal 130.

Figure 2:
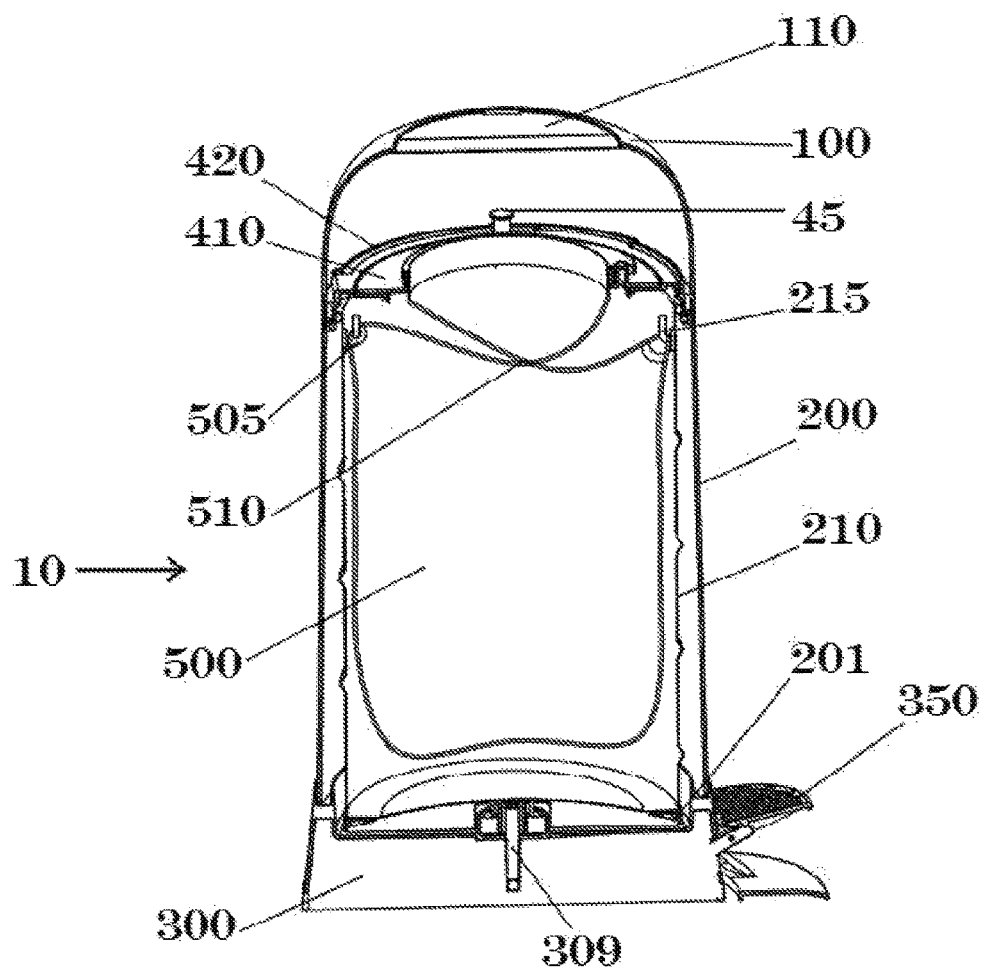
FIG. 2 is a vertical cross-sectional view taken along line 2-2 of FIGS. 1A and 1B.

FIG. 2 depicts cross-sectional view of the container assembly 10 taken along line 2-2 of FIG. 1A. A disposable bag 500 can be mounted within the container assembly 10. In the depicted embodiment, a neck 510 of the disposable bag 500 can be twisted in a closed formation. The base 300 can have a rotatable axle 309 on which a barrel base 201 of the inner barrel 210 can be coupled to. When the foot pedal 350 is at rest, the neck 510 of the disposable bag 500 can be in a twisted-closed formation. When the foot pedal 350 is compressed, the inner barrel 210 can rotate in a first direction untwisting the neck 510 of the disposable bag 500 to an open formation. When the foot pedal 350 is released, the inner barrel 210 can rotate in a second direction returning the disposable bag 500 to the closed formation.

It should be noted that U.S. Pat. No. 5,125,526 teaches a garbage can where the top lid opens simultaneously with the untwisting of its bag. In other words, their actions are synchronized, and for desirous reasons. The inventors of the current application, however, surprisingly discovered the advantages of having such top lid (door 110) moving independently of an untwisting of the bag 500 in some embodiments of the current disclosure. Accordingly, in yet other embodiments, the actuated change in open or closed formation of the disposable bag 500 can be independent of the movement of the top transparent doors 110. That is, when waste such as a dirty diaper is dropped through the door 110, the user-actuated untwisting into an open formation cannot occur simultaneously. The top door 110 facilitate touch-free passage of a dirty diaper through the top 100 so a user may simply drop the dirty diaper on top of the door members 110 without physically touching any part of the waste disposal system. The dirty diaper is to pass through the top door 110 and rest atop the twisted-closed neck 510 of the disposable bag 500. This allows a user to keep the dirty diaper in the sealed top chamber, and then compress the pedal 350 to untwist and open the bag 500, thereby keeping malodorous gas within the diaper pail when the dirty diaper drops into the cavity of the bag 500. This way, when a user deposits the dirty diaper, malodorous gas from within the inner cavity of the bag 500 does not immediately escape through the top transparent door 110 and into his/her face. Once the pedal 350 is released, the bag 500 twists closed thereby retaining undesirable odors inside.

In the embodiments shown in the drawings, a foot pedal 350 is shown. A foot pedal 350 is only one type of contemplated actuators. Embodiments may use other types of actuators, such as a motion sensor, a weight sensor, a button, or a handle. The purpose of the actuator is for a user to pass on command (either electronically or mechanically) to the base, which contains corresponding mechanism (gears, electronic motor, rotating axle, etc.) to rotate the inner barrel 210. In the case of a motion sensor, a user would simply wave his/her hand or foot in front of the motion sensor to activate it, which in turn activates an electric motor in the base 300, causing the motor to rotate the inner barrel 210. Alternatively, the motion sensor can be installed inside of the top chamber to detect whenever the top door members 110 move, or whenever an object enters into the top chamber. In one embodiment, the diaper pail can allow a few seconds of delay before an electric motor in the base 300 is activated to turn the inner barrel 210. These few seconds of delay can allow the top transparent doors 210 to completely close, before untwisting of the bag 500. In the case of a weight sensor, the weight sensor may be installed at a place that would detect a dirty diaper entering into the top chamber and dropping onto the twisted-closed neck of bag 500. Likewise, the weight sensor can activate an electric motor in the base 300 to rotate the inner barrel 210.

Furthermore, in some embodiments, there is at least 5 cm of clearance height between the top surface of the door member 110 and an upper rim of the disposable bag 500 when the door 110 is closed. This allows for sufficient space for the waste material to pass through the top door members 110 and for the top door members 110 to swing shut thereafter, while the waste material remains in the top chamber. Alternatively, the clearance height can be at least 6 cm. In yet another embodiment, the contemplated clearance height can be at least 7 cm; and other embodiments can have a clearance height of 10 cm and above.

In one embodiment, the clearance height can create a closed chamber where a dirty diaper may stay temporarily, before it is disposed into the inner cavity of bag 500. Some chamber embodiments can be partially transparent, such as having transparent walls or door members 110, so a user may see whether or not the dirty diaper has successfully dropped in to the bag 500. As described earlier, one embodiment of this closed chamber can provide a temporary staging area for a dirty diaper, so that when a user opens the bag 500, the door members 110 are already shut behind it, keeping malodorous gas contained entirely within the container assembly 10.

While the word chamber is used in the claims and throughout this specification, a chamber is not limited to a space confined by structural walls and narrow ingress and egress. The contemplated top chamber can be merely a clearance space between the topmost portion of the container assembly and a closed entrance of the disposable bag 500. In the illustrated examples, the closed entrance can be where the neck of the bag 500 twists shut. In other contemplated examples, the disposable bag 500 does not twist, instead, the closed entrance can be where the neck of the bag 500 is mechanically folded shut, or clamped shut. In more mechanically or electrically complicated embodiments, the bag 500 does not twist, and there can be no rotating inner barrel, the closed entrance to the bag is another door member or set of door members that open and close independent of the top door members 110. In such embodiments, a waste material can enter pass top door members 110, and remains in the chamber region before the second set of door members open to let the waste material fall into the bag 500. In further embodiments, the bag simply hangs in the container, with a clearance space between top door members and a second set of door members, where the two doors (top set and the second set) are independently operated/controlled. In embodiments where a twisting of the bag is not necessary, one may use a bucket (enclosed within the container assembly) or other type of enclosure, instead of a bag, to catch/hold waste material.

In some embodiments, the contemplated waste container can hold waste materials (e.g., dirty diapers) inside, and can have two separately operated/controlled sets of doors/entrances. And the waste material is allowed to stay in a staging area between the two doors/entrances, before allowing the waste material to drop further into the container (which may have a bag, or a bucket, any enclosure, or nothing to catch the waste). One of ordinary skill in the art would immediately recognize a number of different mechanical/electrical/electro-magnetic ways to accomplish this agenda.

It should be noted that, conventionally it is considered unsightly to have a trash can with transparent door members, transparent top, or a transparent body. Conventional wisdom dictates that such transparent structure is undesirable because the idea of having a trash can is to place waste objects out of sight. As demonstrated in the many embodiments disclosed herein, the inventors have surprisingly discovered novel methods and advantages in at least some embodiments by making various parts of a waste container assembly 10 transparent.

Figure 6A:
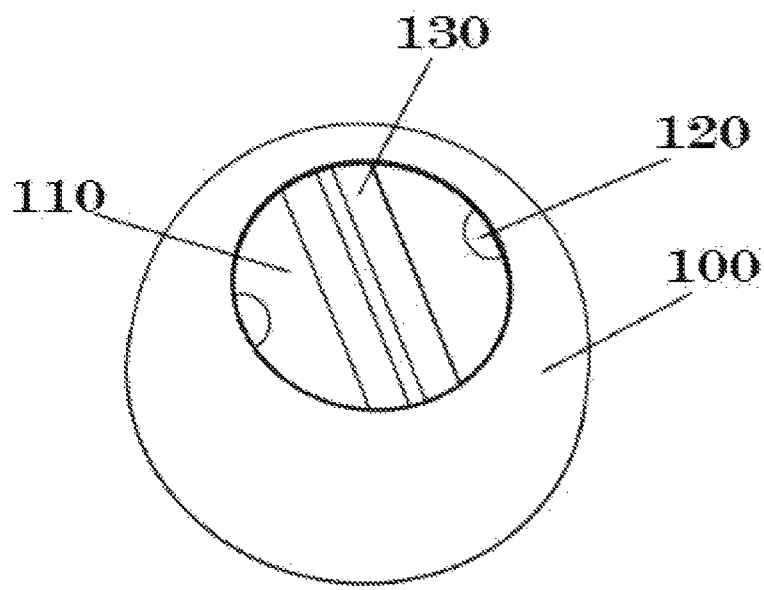
FIG. 6A is a perspective view of the top having two door members.
Figure 6B:
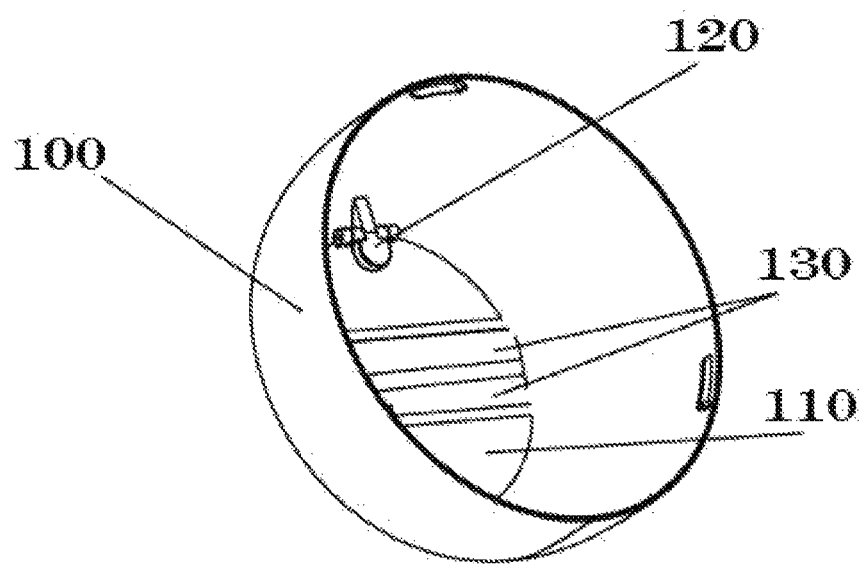
FIG. 6B is a perspective view of the inside of the top of FIG. 6A, while the top is turned upside down.

In some embodiments, contemplated transparent top door members 110 can allow a user to visually inspect the fullness of the bag 500 without risking malodorous gas escaping. Because door members 110 are transparent, the user may simply compress the food pedal 350 and look down into the bag 500, while the top transparent door members 110 remain shut, keeping malodorous gas in. All of this can be done without risking escaping malodorous gas, because the top chamber essentially acts as the barrier. FIGS. 6A and 6B show the top 100 of the diaper pail. The top 100 is in a form of a lid, and its interior space is essentially the top chamber.

While the top 100 is shown in the form of a detachable lid, many other contemplated configurations are possible. For example, the top 100 can be made as an integral part of outer barrel, and the disposable bag 500 can be inserted/removed through a much larger top door 110. In another embodiment, the disposable bag 500 can be inserted/removed through a side door (through both the inner barrel and the outer barrel).

Referring now to FIG. 2 with respect to bag attachment mechanisms, FIG. 2 features at least one bag attachment mechanism 215 in the inner barrel 210. In other embodiments, there are two bag attachment mechanisms 215 that may be located directly opposite one another on the inside of the inner barrel 210. In some embodiments, the disposable bag 500 has at least one receiver 505 to make detachable coupling to the at least one bag attachment mechanism 215. In the depicted embodiment, the disposable bag 500 can detachably couple to the inner barrel 210 at the attachment mechanisms 215, while the top rim of the bag 500 can be coupled to parts of the outer barrel casing 200. In some contemplated embodiments, the receiver 505 can be one of a hole, a sleeve, a tag, a strap, a tethering, a loop, a reinforced hole, and a reinforced tab. In FIG. 2, the two receivers on the bag 500 are reinforced holes, and the bag attachment mechanism 215 on the inner barrel 210 is two hooks. By detachably attaching the receiver 505 of the disposable bag 500 to the inner barrel 210, the bag 500 can rotate with the inner barrel 210 (while the top rim of the bag remains stationary) in one direction to an open formation, then rotate the bag 500 in another direction to closed formation (while the top rim of the bag remains stationary). In the embodiments of FIG. 2, this can be done by compressing and releasing the foot pedal 350. Other contemplated attachment mechanisms 215 include a peg, or a clip. Also contemplated is where the inner barrel 210 uses mechanical structures such as clips, folds, tentacles, protuberance, or any surface material (even flat rubbery surface) to cause friction with the disposable bag 500 to grasp the bag 500, and the bag 500 is not required to have corresponding structure. This way, a user may use any typical garbage bag in the inner barrel 210, and the contemplated inner barrel can still twist the body of the bag 500 in relation to the top rim of the bag 500.

Further depicted in FIG. 2 is another bag attachment mechanism, the purpose of which is to couple the top rim of the bag 500 to the outer barrel casing 200. In this way, when the body of bag 500 rotates along with inner barrel 210, the top rim of the bag 500 can remain stationary along with the outer barrel casing 200. As shown in FIG. 2, this top rim attachment mechanism can be a frame assembly 400 disposed on top of the inner barrel 210. Most preferably, the frame assembly 400 is disposed above the inner barrel 210, but does not have physical contact with the inner barrel 210. A top rim (open edge) of the bag 500 is removably mounted onto the inner circumference of the frame assembly 400. The frame assembly 400 is comprised of a roller base 420 and a bag frame 410. The bag frame 410 is configured to rotate or spin by hand, relative to the roller base 420. In the pictured embodiment, a user may pull out and hold protruding peg 45, and then manually move the protruding peg 45 in a rotating direction to move the bag frame 410. Releasing peg 45 can lock the peg 45 in position when needed, especially after the top rim of the bag is rotated, thereby twisting its neck. Other embodiments do not feature the peg 45. The purpose of the peg 45 and the bag frame 410 is for a user to "preload" the disposable bag 500 into a twisted-closed formation. In operation, to install a bag 500 a user would first remove or tilt open the top 100 and the frame assembly 400 from the container assembly 10. Now that the inner barrel 210 is exposed, the user can place bag 500 into the inner barrel 210, and attach the body of the bag 500 to bag attachment mechanism 215 on the inner barrel 210. After the bag is secured to the inner barrel 210, the user can next install the frame assembly 400 onto the container assembly 10 (while the bag is entirely within the inner barrel 210). The user can next reach his/her hand through the center opening of the frame assembly 400, and pull the top rim of the bag 500 through the center opening of the frame assembly 400. The idea is to next fasten the top rim of the bag 500 to the frame assembly by necessary means, and then manually "preload" the disposable bag 500 by twisting close its neck.

Still further contemplated embodiments feature a ridge on the bag frame 410 to spin relative to the roller base 420. In yet another contemplated embodiment, the bag frame 410 features a space or opening to fit a finger or fingers to rotate the bag frame 410.

Alternatively, the top rim bag attachment mechanism can also be simple mechanical means such as hooks, pegs, or clips, to grasp and fasten the top rim of bag 500 to a frame assembly 400.

Figure 3A:
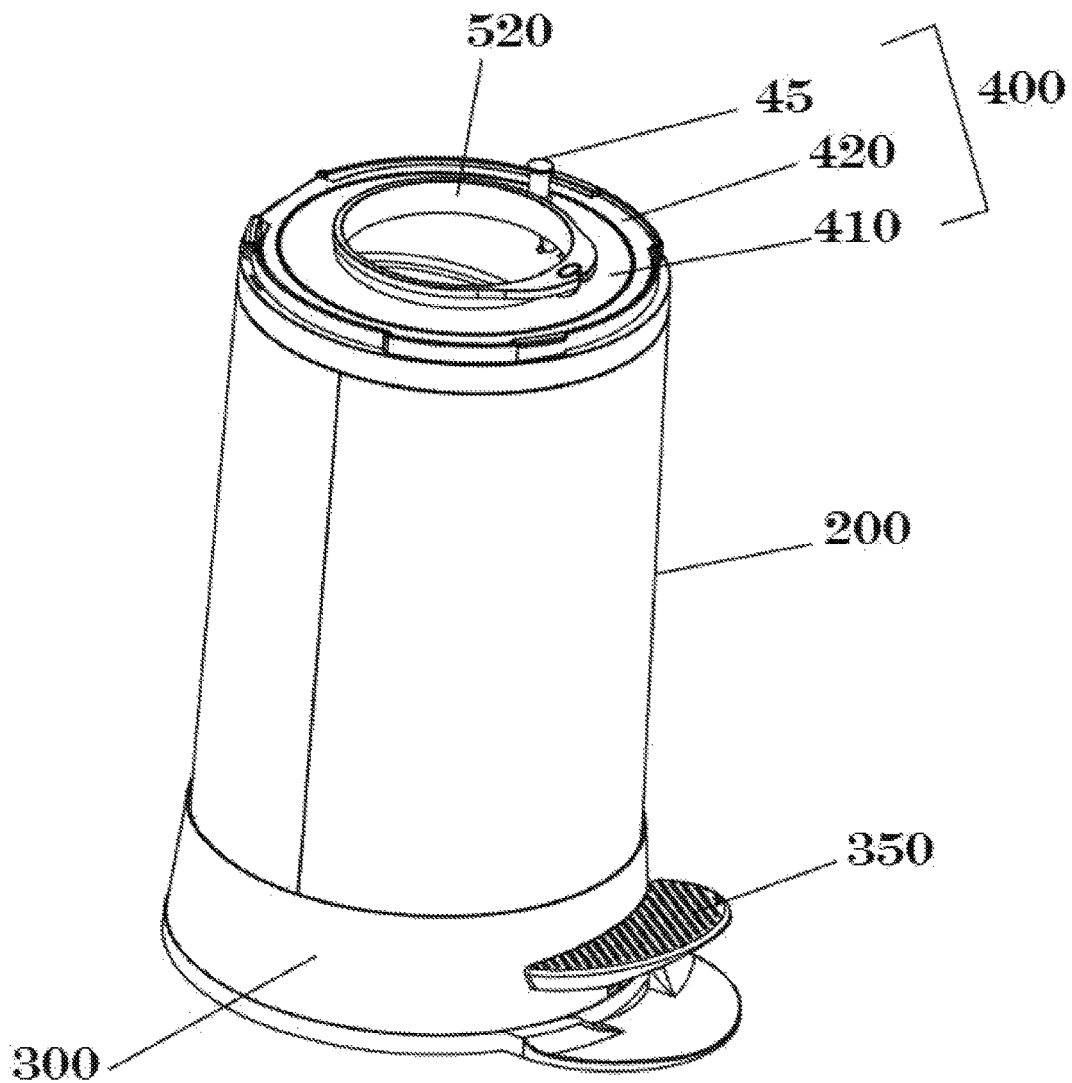
FIGS. 3A and 3B are top angled perspective views of the diaper pail of FIG. 1A with the top removed, where the bag assembly has a collar of FIG. 12B mounted on the frame assembly (the bag body portion is not shown for easier illustration).
Figure 3B:
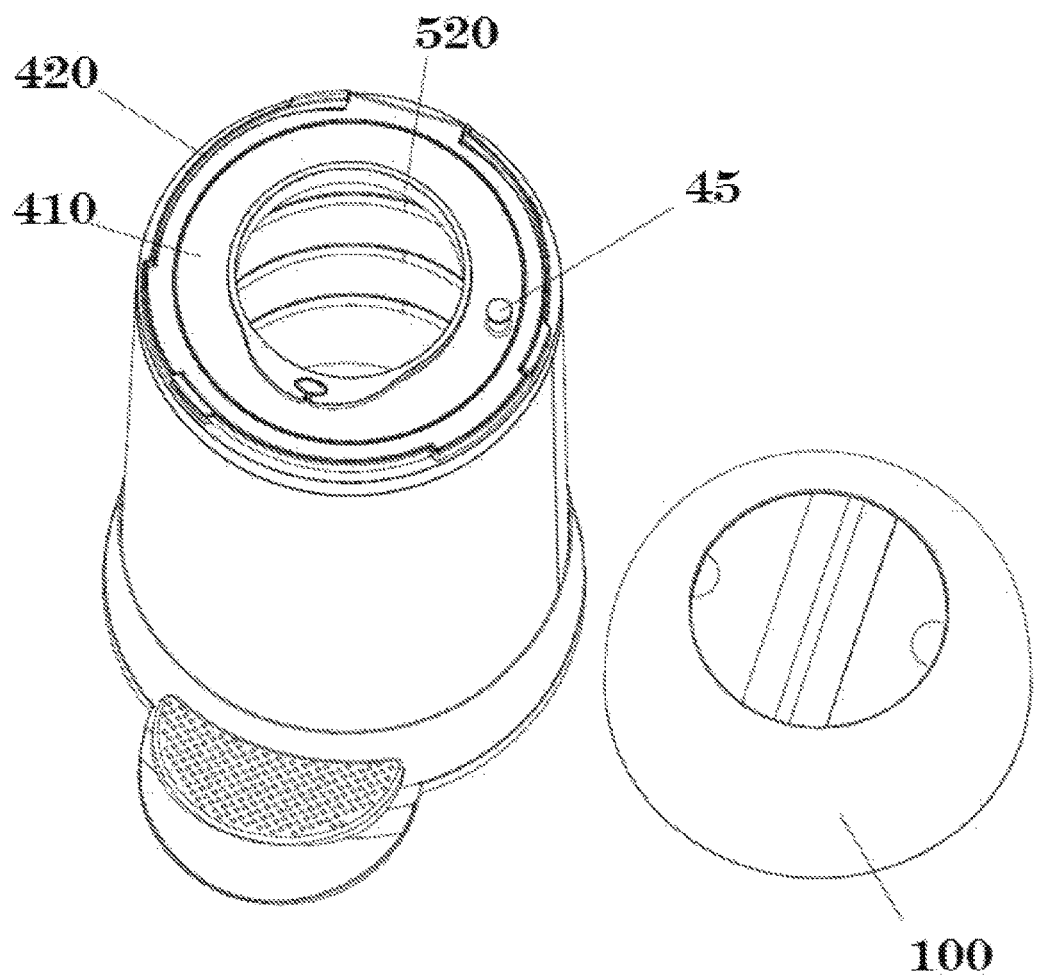

FIGS. 3A and 3B depict a diaper pail 10 with its top 100 removed for better illustration. From the depicted view, a contemplated embodiment of the frame assembly 400 is shown. In the depicted embodiment, the frame assembly 400 can be positioned above the inner barrel 210 and along the inner circumference of the upper end of the outer barrel casing 200. In FIGS. 3A and 3B, a user had already reached through the center opening of the frame assembly 400, and pulled out the top rim 520 of the bag 500. Here, the top rim 520 of the bag 500 happens to be a preformed collar 520 similar to FIGS. 12A and 12B. And for easier illustration, the bag assembly 500 in FIGS. 3A and 3B are not fully shown; only its collar 520 is shown. Or, alternatively, in FIG. 3B, the bag assembly 500 is shown having a collar 520 and a transparent bag body portion. Because the bag body portion is transparent, one may see through it and see the internal wall of the inner barrel 210. An overview of the various embodiments of the bag assembly 500 can be seen in FIGS. 10-15B. The user next removably mounts collar 520 along the inner circumference of the frame assembly 400, more specifically it is mounted on the bag frame 410. In contemplated embodiments, the ring or collar 520 is preformed with or coupled to the open end (top rim) of a disposable bag 500 (as shown in FIGS. 10, 11, 12A, 13A, 14A, and 15A). Now the bag 500 is fixed in position, where its top rim is removably mounted onto the frame assembly and its body is detachably coupled to an attachment site of the inner barrel 210. Rotation of the inner barrel 210 now effectively twists the neck of the bag 500.

Figure 3C:
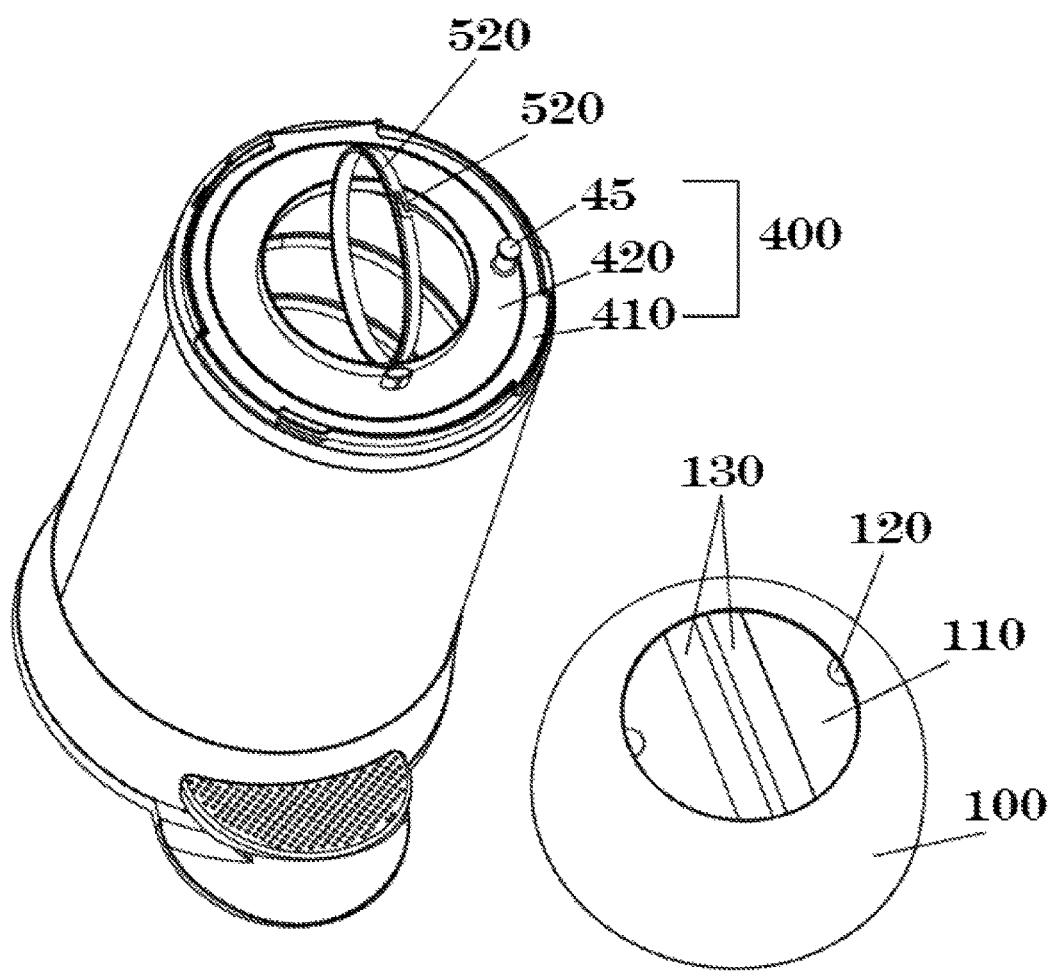
FIG. 3C is a top angled perspective view of the diaper pail of FIG. 1A, with the top removed, where the bag assembly has a collar of FIG. 14B not yet mounted on the frame assembly (the bag portion is not shown for easier illustration).

FIG. 3C is a perspective view of the diaper pail top 100 and the rest of the diaper pail 10 of FIG. 1A with a disposable bag collar 520 halfway pulled through the center hole of the frame assembly 400. In FIG. 3C, for better illustration purposes the rest of the bag 500 is not shown, and only the collar 520 of the bag is shown. In operation the bag 500 can be always attached to the collar 520. In other embodiments, the bag collar 520 can be welded or somehow permanently coupled to a disposable plastic bag 500 by the manufacturer. Here in FIG. 3C, the collar 520 can be sufficiently flexible so a user may squeeze it or deform it into an oval shape so the collar 520 can insert through the inner circumference of the frame assembly 400.

In another embodiment, the collar 520 can be individually provided without a bag 500 permanently attached to it. In such embodiment, which looks like that shown in FIG. 3C, the collar 520 alone snaps in the rim of the center hole of the frame assembly, thereby acting as a first bag attachment. Basically, one can pull the open mouth of a conventional garbage bag from under the frame assembly 400 and through the center hole of the frame assembly 400. The user can then spread the mouth of the conventional garbage bag over the frame assembly. Next, the collar 520 by itself can be snapped and wedged onto the inner rim of the center hole of the frame assembly, sandwiching the mouth of the conventional garbage bag in between.

Figure 4:
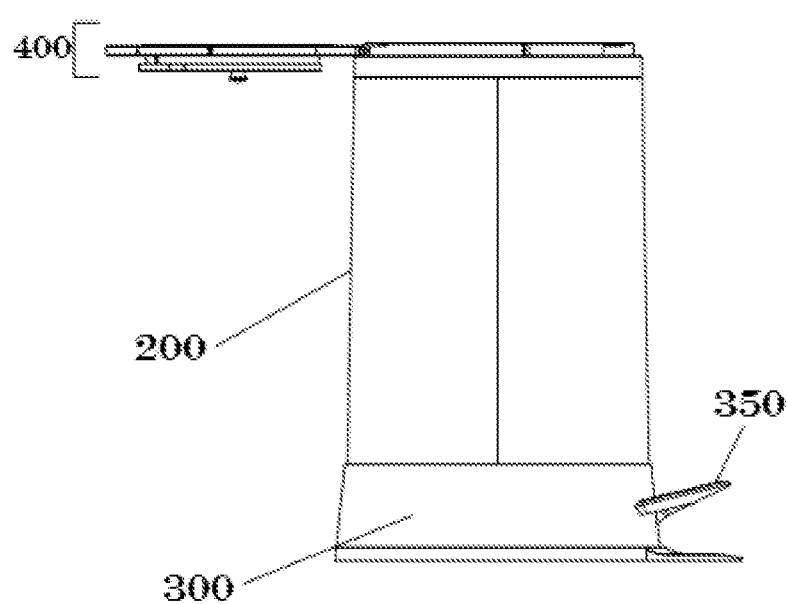
FIG. 4 is a side view of the diaper pail with the top removed and the frame assembly pivot open.
Figure 5:
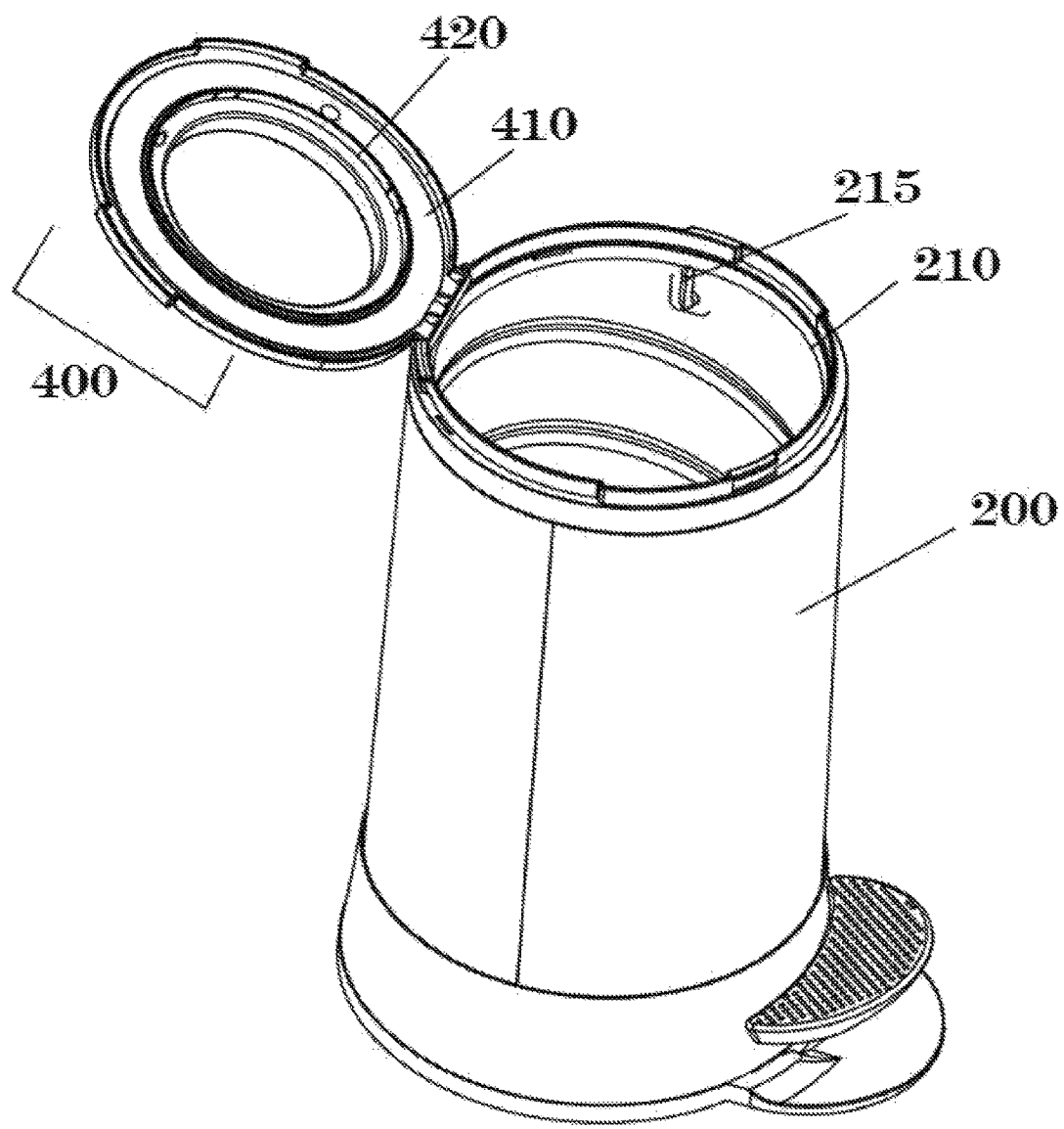
FIG. 5 is a top side perspective view of the diaper pail of FIG. 4.

FIGS. 4 and 5 show an embodiment where the frame assembly 400 can be pivotably coupled to the outer barrel casing 200. Here, the frame assembly 400 is pivoted open. FIG. 5 shows a close-up view of the frame assembly 400 coupled to the outer barrel casing 200 via a hinge. In this embodiment, the frame assembly 400 can be coupled to the outer barrel casing 200 via a hinge such that the frame assembly 400 can be flipped open when the disposable bag is full and should be removed or replaced. In other embodiments, the frame assembly 400 cannot be pivotably attached to the outer barrel casing 200, and can be completely removed/detached from the diaper pail 10 in order to change a disposable bag 500.

Additionally, FIG. 5 further illustrates a close-up view of the bag attachment mechanism 215 located on the inside of inner barrel 210. In the depicted embodiment, the attachment mechanism 215 can be a hook. Additionally, it should be appreciated that there can be additional attachment mechanisms including a peg or a clip, and those contemplated herein may be derived in numerous manners.

FIG. 6A is a perspective view of the exterior of the top 100. FIG. 6B is a perspective view of the interior of the top 100 with the top 100 flipped upside down. Top 100 can be detachably fastened to the outer barrel casing 200 by conventional methods such as being screwed on, or snapped into corresponding groves on the top rim of the outer barrel casing 200. In the pictured embodiment, the top can have two pivoting transparent door members 110, each being semi-circular in shape. In general, embodiments can have at least one door member 110 coupled to the top 100. Also shown is a close-up of the two seals 130, each of which is attached to the far ends of the two door members 110. When the two door members 110 close, their flexible seals 130 overlap each other, making an airtight seal. In one embodiment, these seals 130 can be made of transparent material. Additionally, each of the door members 110 can be biased shut via a resilient piece 120. The resilient piece 120 can be coupled to the hinges and acts as a spring, yet resiliently allowing the doors to pivot open when a dirty diaper is dropped on the door members 110 based on gravitational pull, thereby providing a touch-free means to dispose the dirty diaper. As mentioned previously, the resilient piece 120 includes and is not restricted to a spring coil, silicone or rubber piece. The resilient piece 120 must have sufficient spring tension such that after the door 110 opens, and the dirty diaper passes through, the door 110 will automatically swing back to its original position (shut).

Figure 7A:
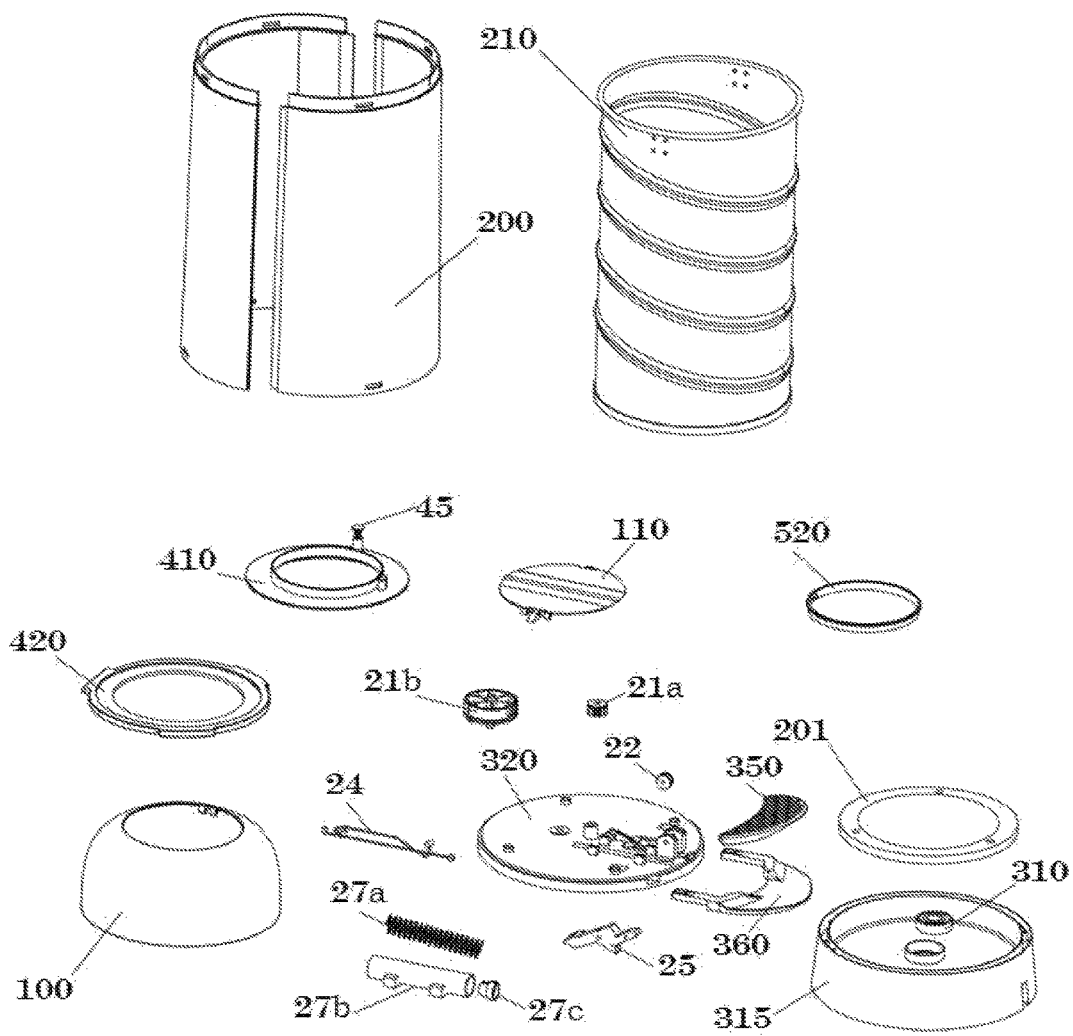
FIG. 7A is a perspective view of all the parts of the embodiment of FIG. 1A.
Figure 7B:
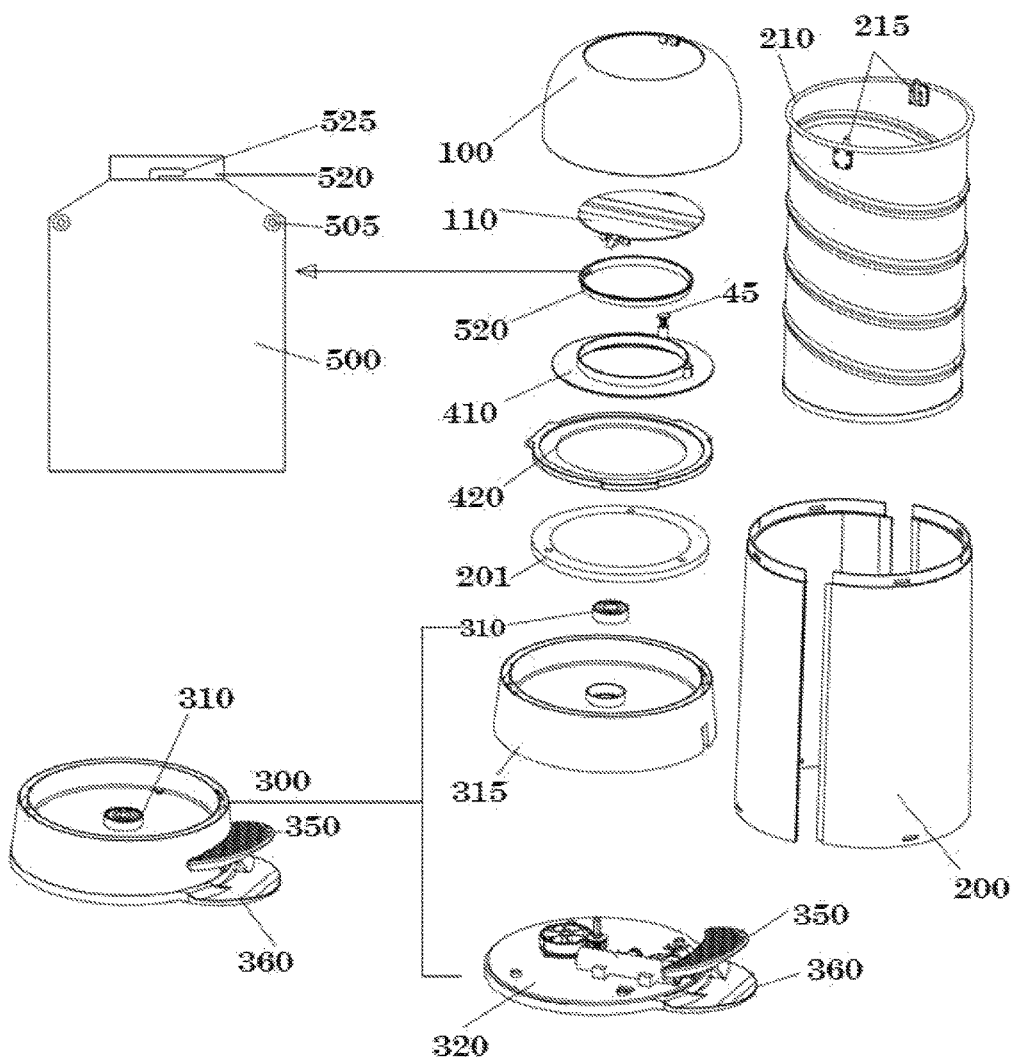
FIG. 7B is an exploded view of all the assembly parts of the embodiment of FIG. 1A.

FIG. 7A shows the assortment of the various parts in the diaper pail 10 of FIG. 1A. FIG. 7B is an exploded view of all the assembly parts of the embodiment of FIG. 1A. The exploded view in FIG. 7B features a top 100 and its top door members 110. A bag collar 520 (which can or cannot be permanently attached to a bag 500, not shown) and frame assembly 400. The frame assembly 400 can include a peg 45 which fits into a slot in the bag frame 410, and the bag frame 410 can rotate relative to the roller base 420. In the pictured embodiment, the inner barrel 210 can fit onto an inner barrel base 201. The base 300 can be comprised of a rotatable axle 309 (having a hexagonal cross-sectional shape), base cover 315, a base part 320, a bracing piece 360 and pedal 350. The inner barrel base 201 can have a corresponding hexagonal female end to couple to the rotatable axle 309 such that the inner barrel 210 can be driven by the rotation of the axle 309. In this embodiment, the outer barrel casing 200 can be transparent and can encase the circumference of the inner barrel 210.

Figure 8A:
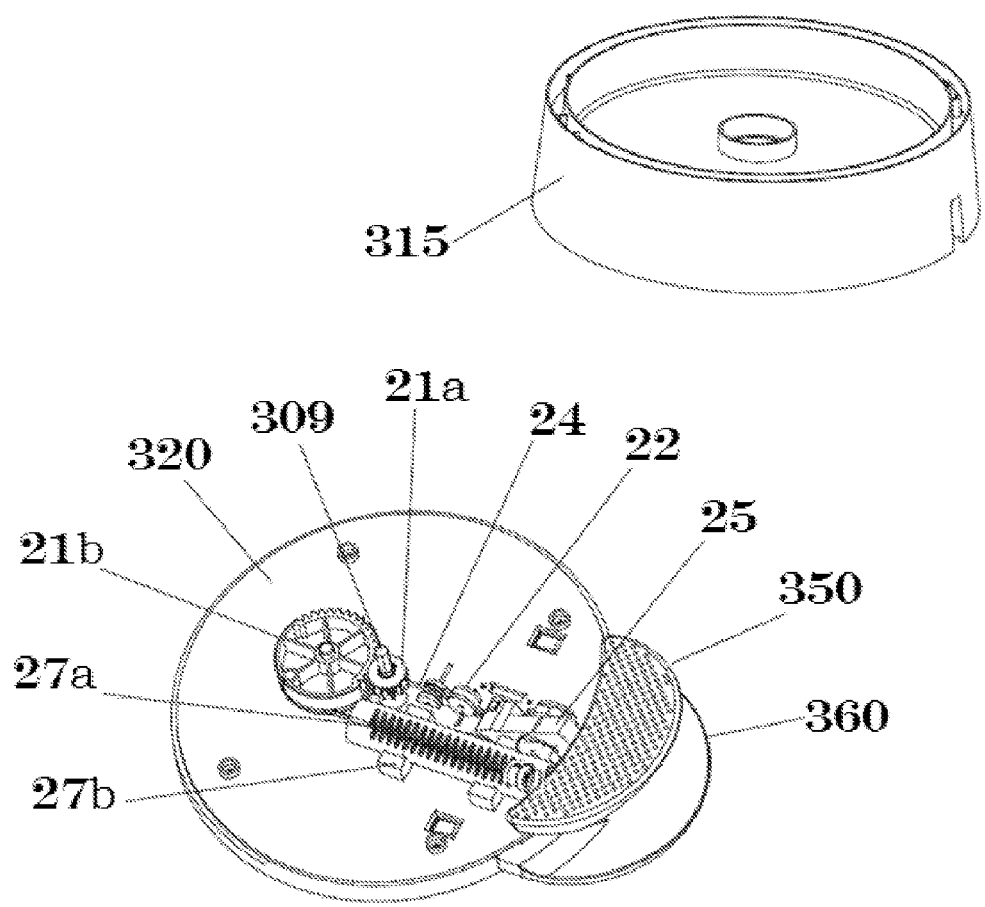
FIG. 8A is a perspective view of the inner parts of the base and pedal of the embodiment of FIG. 1A.
Figure 8B:
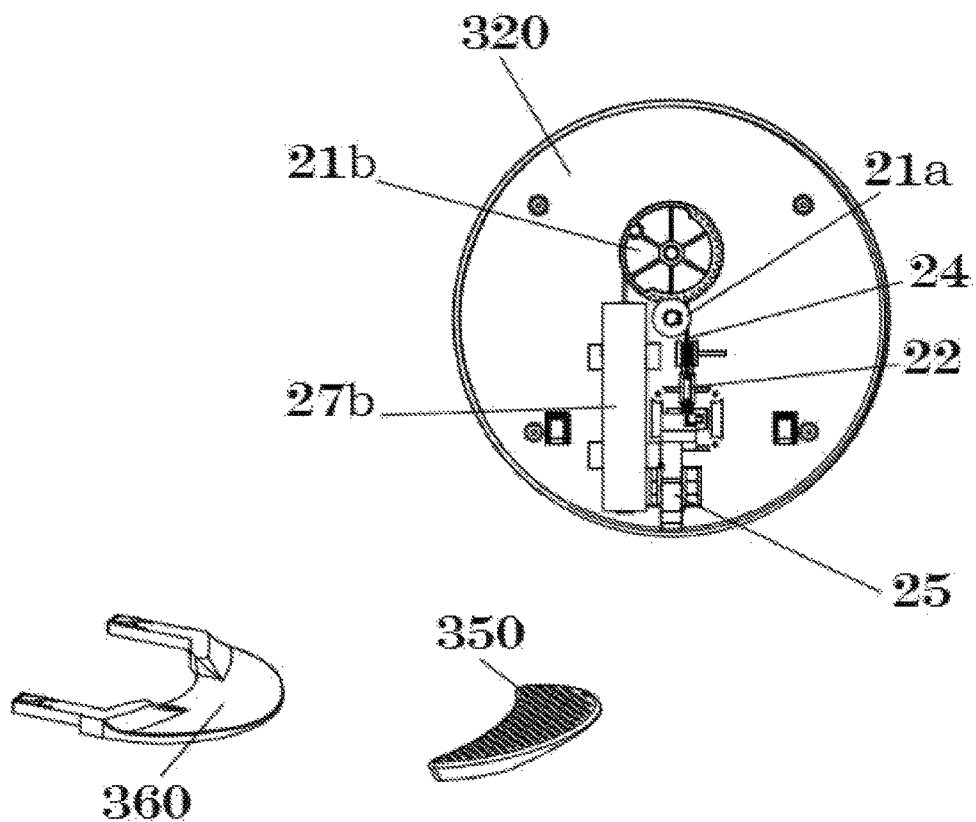
FIG. 8B is a top view of the base and perspective view of the pedal and bracing piece of the embodiment of FIG. 8A.
Figure 8C:
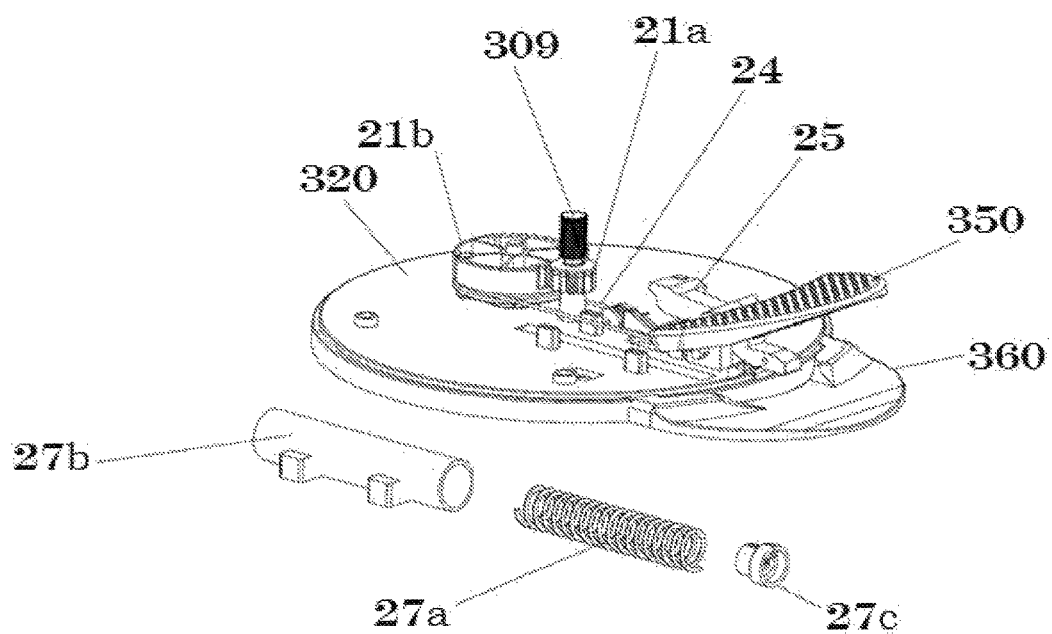
FIG. 8C is another view of the base and pedal of FIG. 8A, where the spring, spring plug, and the spring cover is taken apart.

FIGS. 8A-8B depict close-up views of the internal components in the base 300. In the embodiment shown in FIG. 8A, the base part 320 can have the following parts: A spring plug 27c is coupled to a spring 27a, and a transparent spring cover 27b encases both the spring plug 27c and spring cover 27b. A large gear 21b is fixed on the base part 320 and coupled to a small gear 21a, which can be fixed on the base part 320. Turning of the large gear 21b can in turn rotate small gear 21a, which also turns the axle 309 which can be attached and can sit on top of the small gear 21a. Additionally there can be a roller 22 which can act as a pulley. A metal wire 24 is attaches at one end near the base of the metal lever 25, and entrains about roller 22, and then about big gear 21b, and then enters into spring cover 27b and through the center of spring 27a, and until its terminal end reaches the spring plug 27c. This terminal end is attached to the spring plug 27C. The spring 27a is fixed at its end near gear 21B, and has a biasing force pushing the spring plug 27C in an outward direction. As the spring 27a pushes spring plug 27C outwardly, it pulls the metal wire taut. When a user steps on the foot pedal 350, it in turn pressed down on the outside leg of the lever 25, causing the inside leg of the lever 25 to go up. Because this leg of the lever is in abutting contact with the metal wire 24, upward movement of this inside leg of the lever 25 also pulls on the metal wire 25, against the roller 22 to which the metal wire 24 is partially leveraged against. As the metal wire 25 begins to pull against the force of the spring 27, the metal wire 25 moves, lengthwise, away from the spring 27a, thereby rotates the big gear 21b. Rotation of the big gear 21b in turn rotates small gear 21a and axle 309. Accordingly, the inner barrel 210 is coupled to the axle 309; thus, the inner barrel 210 is driven by the axle 309. FIG. 8B depicts a top view of the embodiment as described above. The parts depicted are part of one embodiment of the mechanics behind the rotational mechanism of the presently claimed disclosure. One of ordinary skill in the art would immediately recognize that there are other known rotational mechanisms capable of turning the inner barrel 210.

Figure 9A:
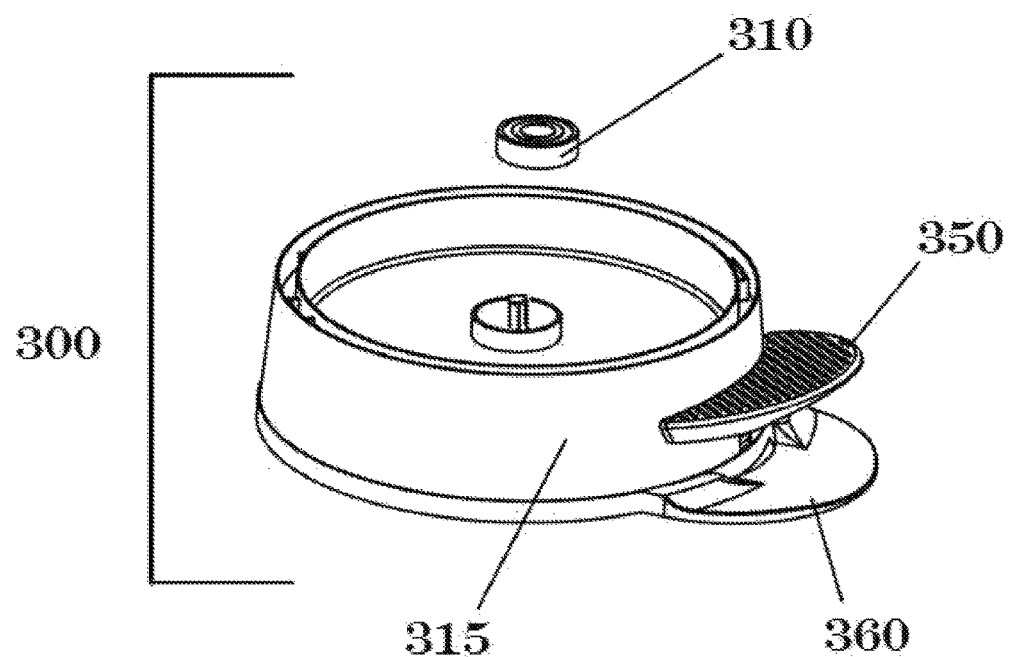
FIG. 9A is a perspective view of an embodiment of an assembled base having a pedal, where the rotating axle extends through the center.

FIG. 9A is a perspective view of a first embodiment of an assembled base 300. In one embodiment, the main parts of the assembled base 300 as depicted include a base cover 315, base part 320, a pedal 350, and bracing piece 360. Protruding out of the center of the base cover 315 is axle 309. Fitted around the axle 309 is a ball bearing 310, to make rotation of the inner barrel 210 smoother. Along the upper rim of the base cover 315 is a groove with corresponding catches to receive the outer barrel 200. In that embodiment, the outer barrel 200 fits into the groove and locks into place by rotating the outer barrel 200 clockwise.

The bracing piece 360 serves to provide sufficient leverage when compressing the pedal 350 so that the diaper pail 10 does not tip or tilt over. In other embodiments, there is no bracing piece 360.

Figure 9B:
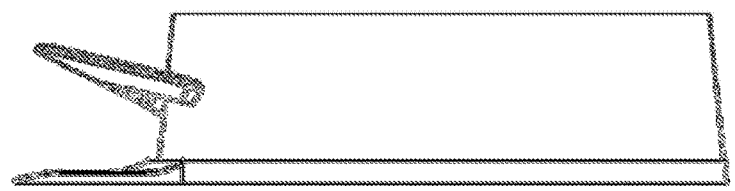
FIG. 9B is a side view of an embodiment of an assembled base.
Figure 9C:
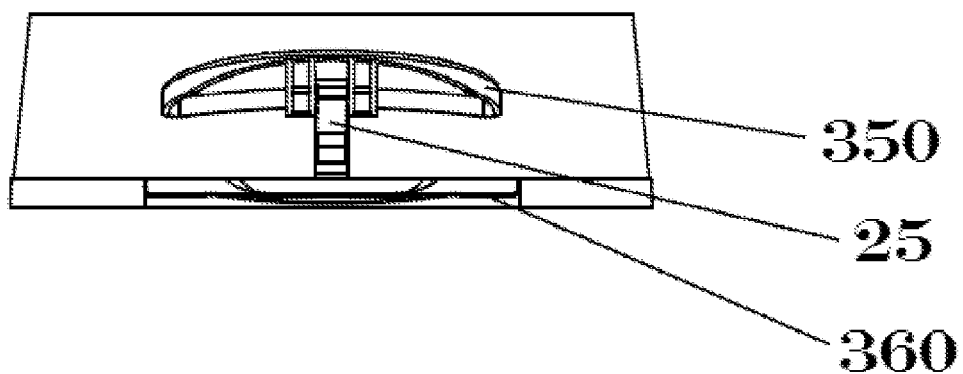
FIG. 9C is a front view of an embodiment of an assembled base.
Figure 9D:
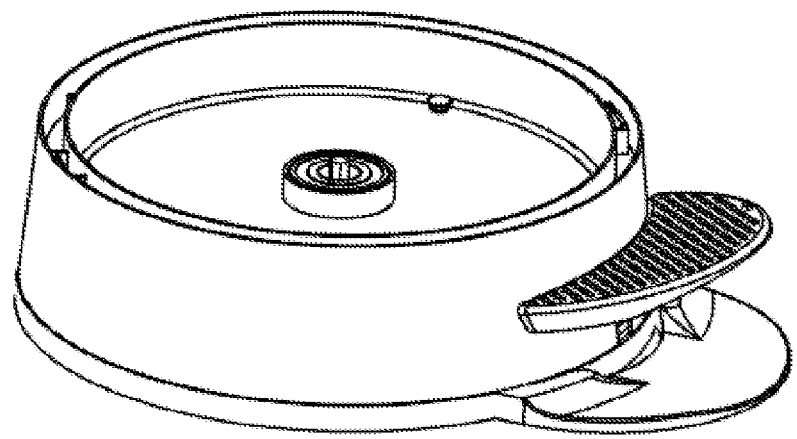

FIGS. 9B, 9C, and 9D are different views of the base 300 of FIG. 9A.

Figure 10:
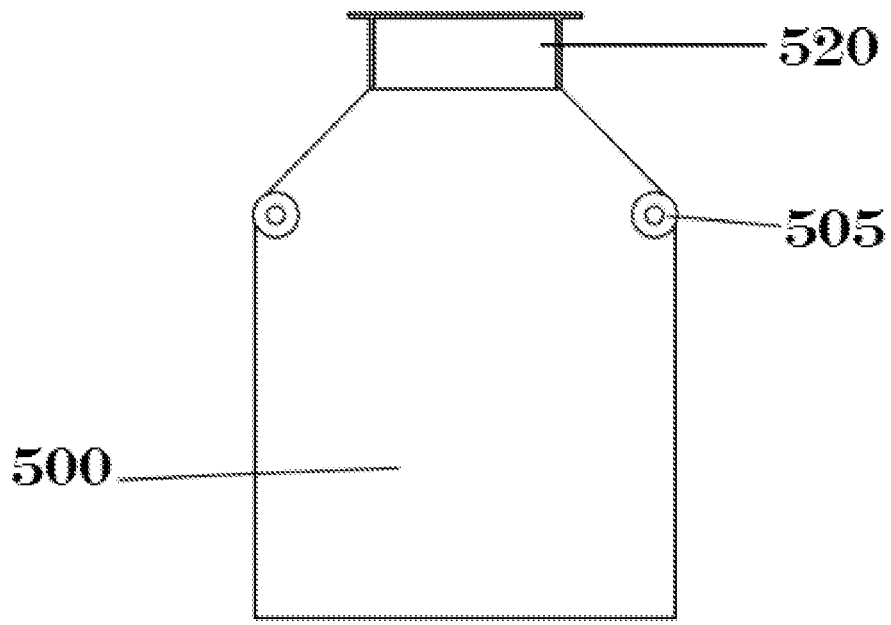
FIG. 10 is an embodiment of a bag assembly with reinforced apertures.

Referring now to FIG. 10 is a disposable bag 500 having a ring/collar 520 permanently welded together with the bag 500. At the shoulder region are two welded/reinforced circular marks 505, the center of which is perforated, forming a through hole. The through holes are for attaching to corresponding bag attachment structures on the inner barrel 210.

Figure 11:
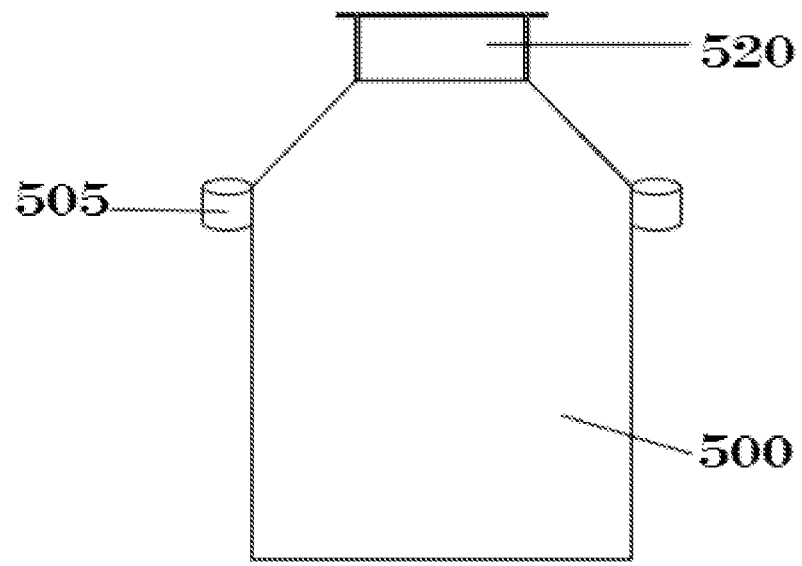
FIG. 11 is another embodiment of a bag assembly with sleeves.

Similar to FIG. 10, FIG. 11 shows a disposable bag 500, the difference being it has two plastic sleeves 505 disposed on the shoulder region of the bag 500. The sleeves are for attaching the bag 500 to corresponding bag attachment structures on the inner barrel 210.

Figure 12A:
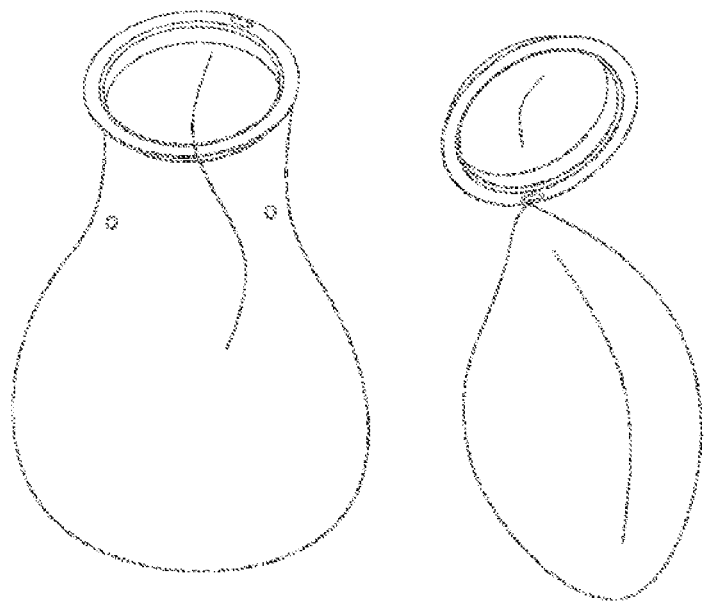
FIGS. 12A-12B is one embodiment of a bag assembly with one type of collar.
Figure 12B:
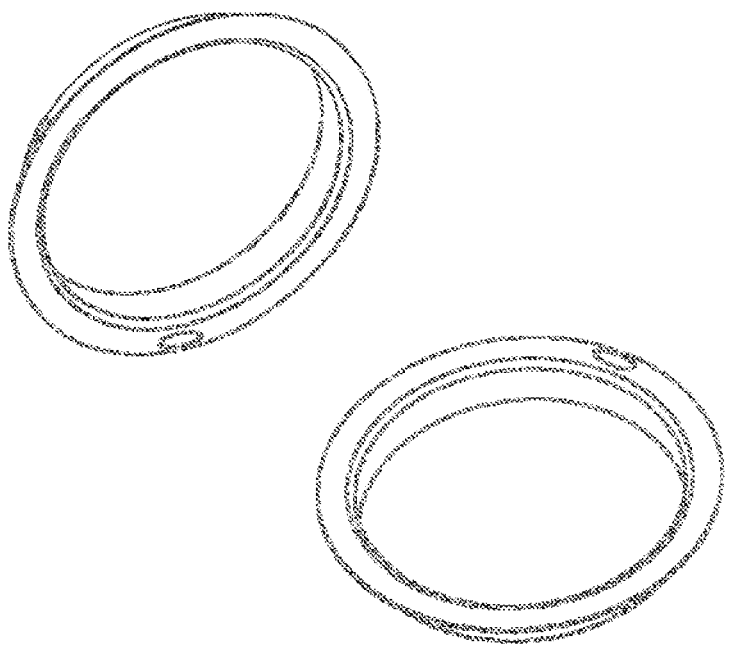

FIG. 12A shows a bag assembly 500 having a first type of collar 520, which is shown closer-up in FIG. 12B.

Figure 13A:
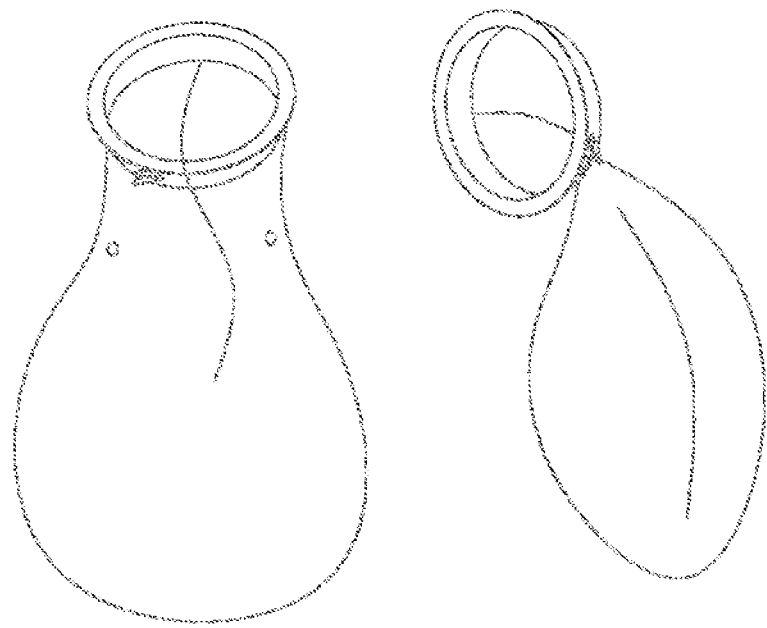
FIGS. 13A-13B is another embodiment of a bag assembly with another type of collar.
Figure 13B:
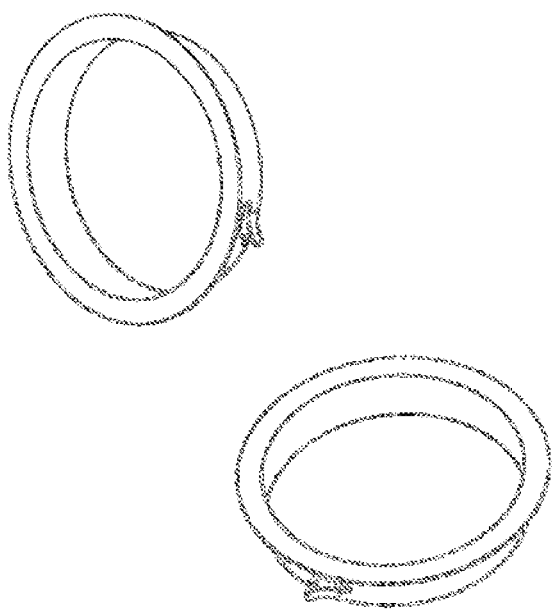

FIG. 13A shows a bag assembly 500 having a second type of collar 520, which is shown closer-up in FIG. 13B.

Figure 14A:
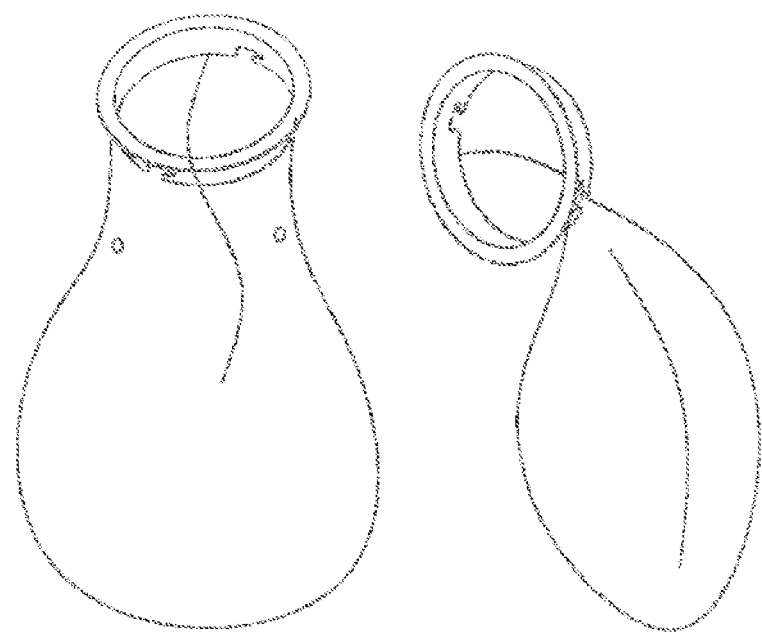
FIGS. 14A-14B is another embodiment of a bag assembly with another type of collar.
Figure 14B:
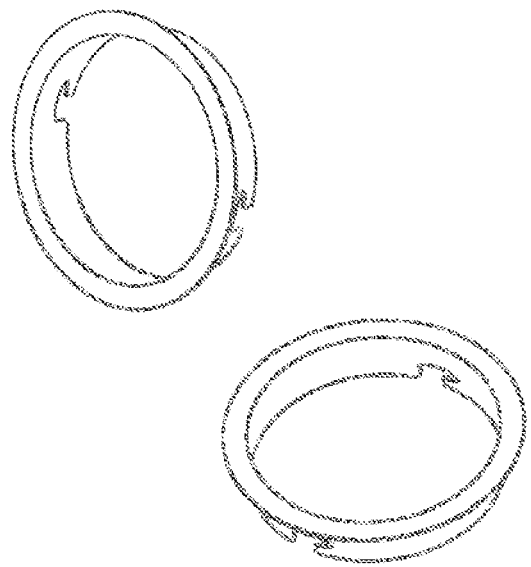

FIG. 14A shows a bag assembly 500 having a third type of collar 520, which is shown closer-up in FIG. 14B.

Figure 15A:
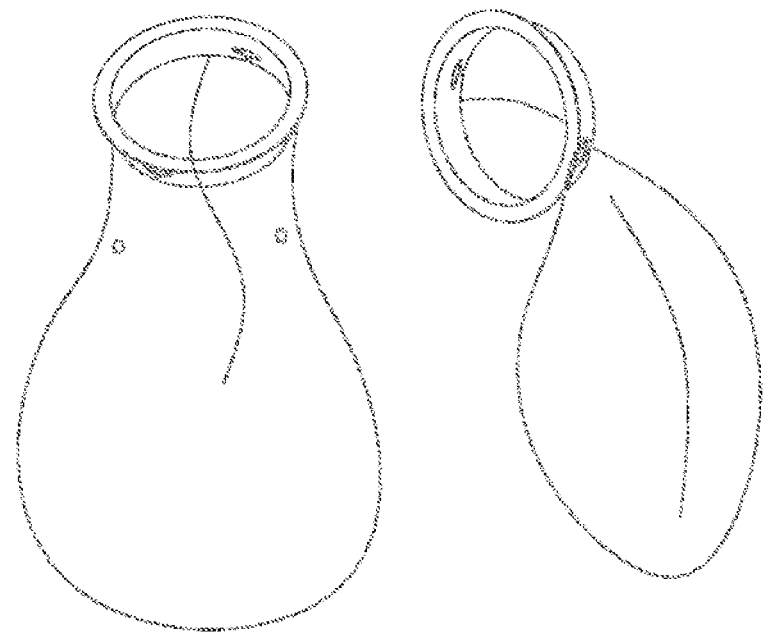
FIGS. 15A-15B is yet another embodiment of a bag assembly with yet another type of collar.
Figure 15B:
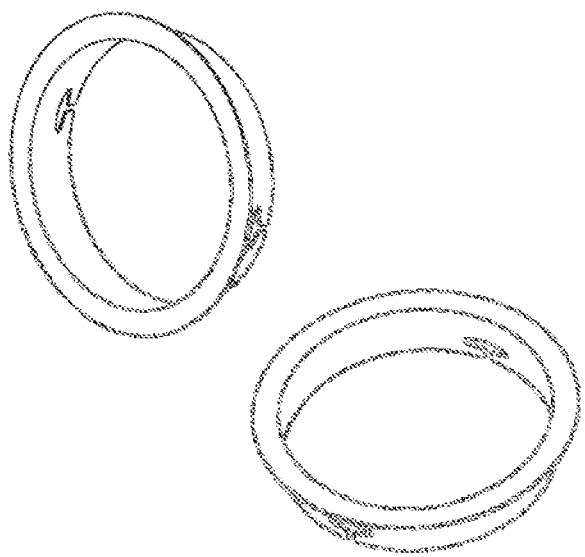

FIG. 15A shows a bag assembly 500 having a fourth type of collar 520, which is shown closer-up in FIG. 15B.

While the above description in general describes certain embodiments where the bag assembly is twisted closed by using a rotating inner barrel and twists the bag against the bag's top rim, which is fixed. One skilled in the art would immediately recognize a variety of ways to implement the inventive subject matter without twisting the neck of a bag.

Figure 16:
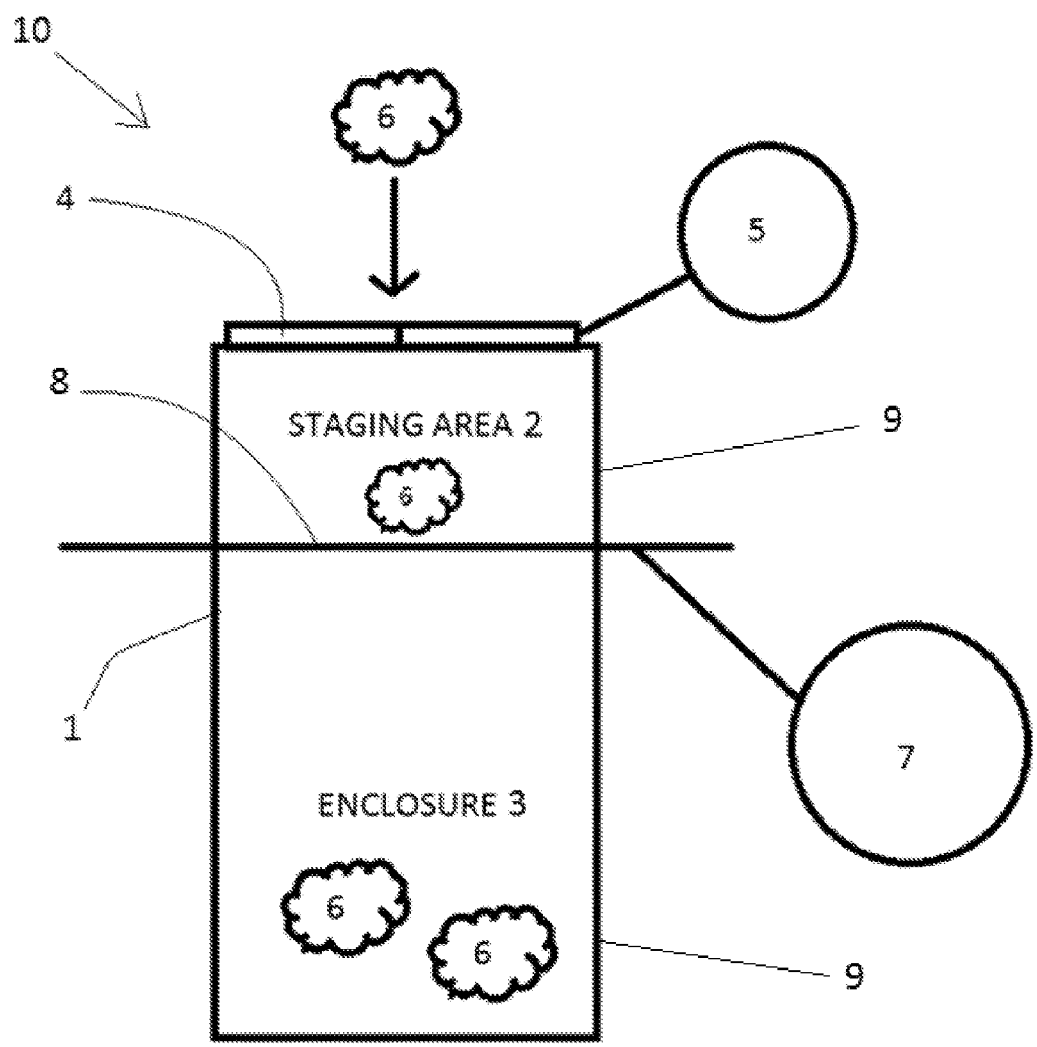
FIG. 16 is a schematic illustrating a more generalized embodiment of the inventive subject matter.

Referring now to FIG. 16, in a more generalized embodiment, a waste disposal system 10 has an enclosure 3 to hold waste material 6. The enclosure 3 is within a container assembly 1. The enclosure 3 can be simply an empty space inside of the container assembly 1. In one embodiment, the enclosure 3 is a disposable bag. In another embodiment, the enclosure 3 is a bucket that fits inside of the container assembly 1.

The container assembly 1 can have a top door 4 having two door members, an outer casing coupled to the top door 4, and an actuator 5 to control an opening and a closing of the door members of the top door 4. This actuator 5 can be any known mechanical, electrical, or magnetic types of controller. It can be as simple as a rubber spring as described above, or as complicated as a motorized unit along with a motion sensor to sense a user waving his/her hand to signal the motorized unit to open the top door 4.

The container assembly has a staging area 2 to temporarily hold a waste material for reasons already described. In one embodiment, the staging area 2 is a clearance space between the top door and the entrance 2 to the enclosure. In another embodiment, the staging area 2 is an isolated chamber. In yet another embodiment, this clearance space can have a height of at least 5 cm.

There can be an entrance 8 to the enclosure 3, and the entrance 8 is independently controlled by actuator 7. An opening and closing of the entrance 8 can be independent of the opening and closing of top door 4. Operation of actuator 7 can be by a foot pedal and a rotating inner barrel as already described to twist shut the neck (i.e., entrance 8) of the bag. In another embodiment, the actuator can involve a motorized unit that selectively opens and closes another set of doors (i.e., entrance 8) upon pressing of a button (or stepping on a button).

In yet another embodiment, a bag is used as an enclosure 3, and the bag does not twist within the container assembly. Instead, a neck of the bag is deformed by mechanical arms to essentially close its neck.

For reasons already described, this waste disposal system 1 can have transparent top door members.

For reasons already described, the waste disposal system 1 can have a transparent outer casing and/or a transparent wall to the staging area 2.

The embodiments as disclosed and described above also serve as an important tool in child development and infant behavior development. It is known that vision may be one of the least developed senses at birth; therefore visual input during the early months may have the most profound effect on baby's development nervous system. While an adult can distinguish many different shades of light and color, a newborn retina can only detect large contrasts between dark and light, or black and white. As the baby grows, the brain receives input from all five senses, causing nerve cells to multiply and form connection with other nerve cells. Study has found that if a baby is kept blindfolded the visual center in his brain would never develop. Some of the best ways to stimulate a baby's vision is using contrasting colors and stripes. As described above, in one embodiment, the outer barrel casing 200 is transparent, allowing a user and the baby to see vibrant rotating colorful stripes disposed on the inner barrel 210. This powerful visual stimulant occurs together with a diaper changing event. Overtime, the visually enticing diaper pail not only stimulates a baby's visual center in his/her brain, it also changes infant behavior by associating diaper changing with such visually fascinating spectacle, acting as a positive reinforcement. Up until now, for infants and toddlers, diaper changing has always been associated with negative feelings.

In the case of toddlers, they are grown enough to be able to look down through the top transparent doors 110 of the diaper pail 10, and see the dirty diaper being swallowed up by the untwisting of the bag 500 (i.e., a fascinating event to watch). This is, too, acts as a positive reinforcement in infant and toddler behavior development.

While the inner barrel 210 is shown in the figures as having vertical stripes, also contemplated are visually enticing graphics on the exterior of the inner barrel 210, for example, contrasting colors of other geometric shapes, and cartoon characters.

Further contemplated embodiments of the contemplated waste disposal system are illustrated in FIGS. 17 through 27C. FIGS. 17-27C and the description below illustrate additional structures that may be used in conjunction with any embodiment of the herein disclosed waste disposal systems. Further, any such additional structures or designs disclosed below may be implemented alone or in combination with any other such additional structures or designs.

Figure 17:
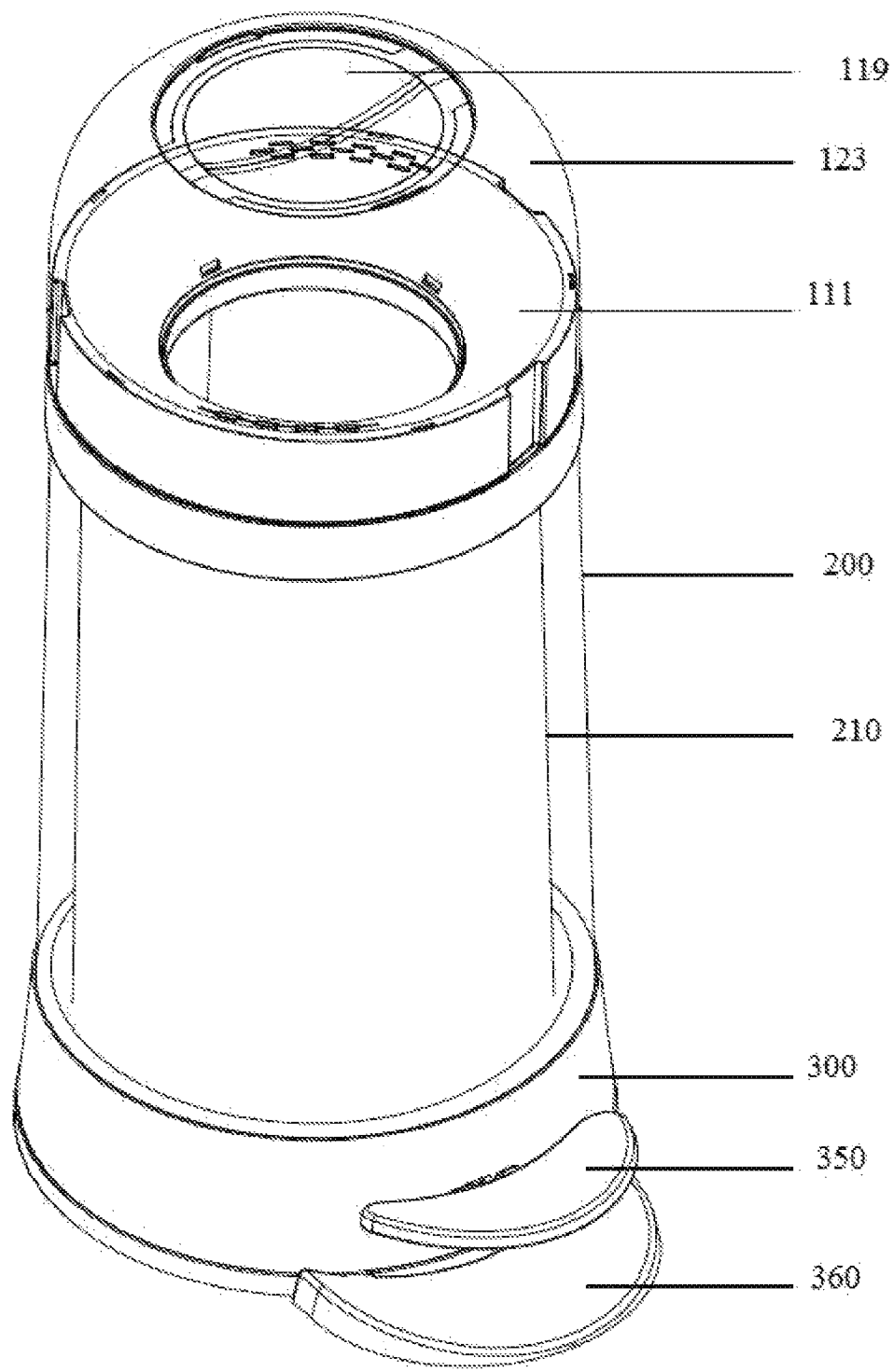
FIG. 17 is a perspective view of an embodiment of a diaper pail having a transparent top chamber and a guiding structure.

FIG. 17 shows a waste disposal system with a container assembly which comprises a base 300, an outer casing 200, an inner barrel 210 having an inner volume and where the inner barrel is inside the outer casing. FIG. 17 also shows a transparent top chamber 123 which can have two door members 119 disposed at the top of the chamber 123. The disposal system can also include a guiding structure 111 where the guiding structure has a downward sloping wall 116 on the top side, and where the downward sloping surface has a lower rim defining a through hole 113 (see FIG. 18).

In FIG. 17, the container assembly is shown having a base 300 with a pedal 350 and a bracing piece 360 protruding out of the base 300. In the depicted embodiment, the outer barrel casing 200 can be transparent or translucent, and the inner barrel casing 210 can be seen through the transparent or translucent outer barrel casing 200, as the inner barrel casing 210 rotates. Yet other contemplated embodiments can feature a partly opaque outer barrel casing 200. Yet another contemplated embodiment can feature a completely opaque outer barrel casing 200. In other embodiments, the top chamber 123 can have at least one door member 119. One of ordinary skill in the art would immediately appreciate that this door member 119 can or cannot be a pivoting type. Other types of door members as discussed above are also contemplated.

Figure 18:
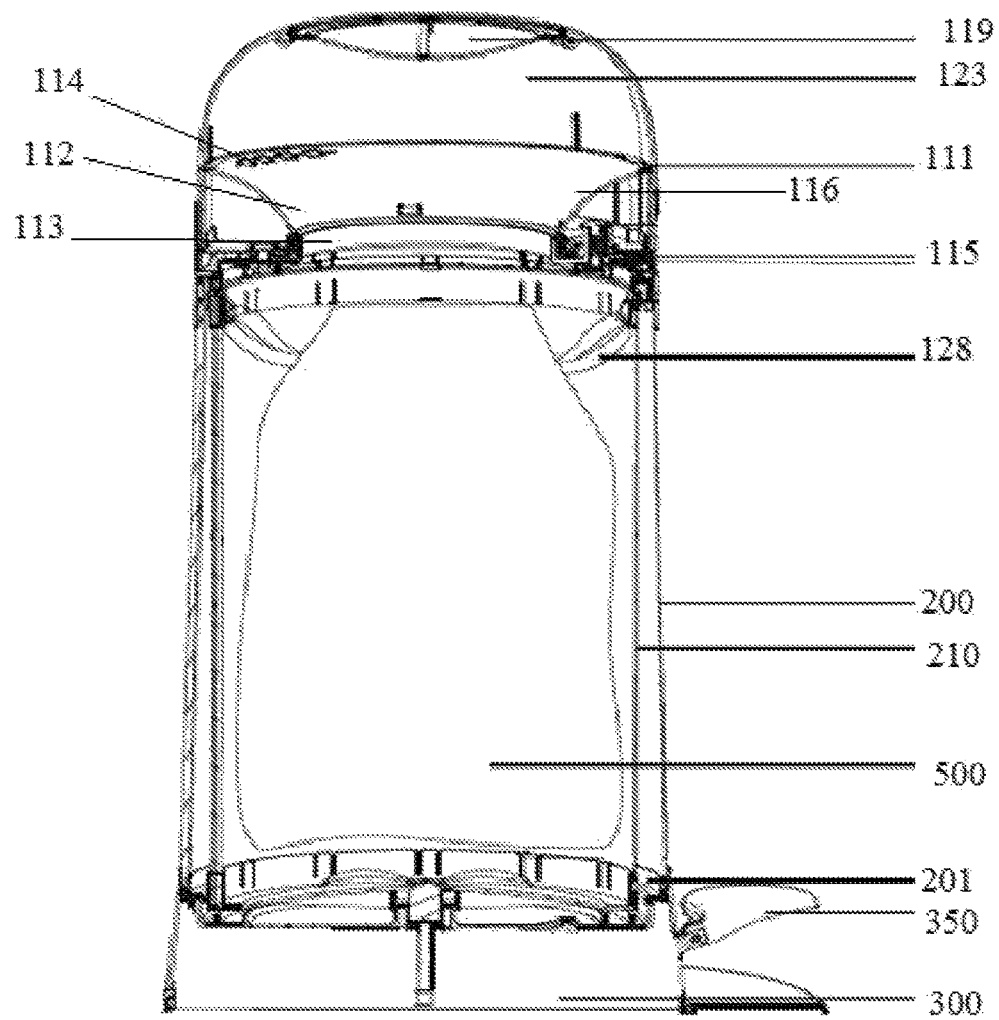
FIG. 18 is a vertical cross-sectional view of FIG. 17.

In the depicted embodiment of FIG. 18, the interior space of the top chamber 123 can be isolated from the rest of the container and from the bottom barrel 210. In other embodiments, the interior space of the top chamber 123 can be isolated from the ambient environment. This isolated top chamber 123 can act as an additional insulation layer ensuring that the waste remains trapped within a bag or bottom of the pail and wherein the escape of odors to the outside environment is minimized. The top chamber can have a solid, transparent, semi-transparent, striped or multilayered casing.

In one embodiment, the top chamber 123 has a transparent or translucent casing through which the user can see a guiding structure 111 disposed within the top chamber 123. The guiding structure with downward sloping wall 116 helps guide objects and waste through the through hole 113 and into the enclosure 500.

In one particular embodiment, the downwardly sloping wall 116 guides a falling object towards the center vertical axis. In other words, when an object falls onto the downward sloping wall 116, the object can bounce or fall back away from the peripheral of the top chamber 123.

As discussed above and elsewhere in this specification, the guiding structure 111 can having guiding walls that may form a funnel shape, a donut shape, cylindrical, a cone, or any other polygonal or structure where the guiding walls facilitate the passage of objects downward and inwardly in a centering fashion. The guiding structure 111 may also comprise a downward sloping wall 116 wherein the downward sloping wall 116 has a lower rim 112 defining a hole 113 for passage of objects and waste.

As will be described in more details later, the guiding structure 111 can have various constructions. It should be particularly noted that contemplated guiding structure 111 can or cannot have a continuous circular downward sloping wall 116 as shown in FIGS. 17 and 18. Contemplated sloping wall 116 can be any physical structure or plurality of structures that can achieve the goal of directing a falling object to fall towards the center vertical axis. For example, the sloping wall 116 can be a sloping mesh, or a plurality of sloping blades, In some embodiments, two pivoting door members 119 can be pivotably attached at the top of the top chamber 123 as illustrated in FIG. 18. When biased closed, these two door members 119 together can have a concave shape and can have a center which is lower than the peripheral edges of the two combined door members 119. Optionally, the two door members 119 together can have a bowl shape when they are closed, the center of the bowl being the lowest point.

As mentioned, the door members 119 can form a parabolic shape or a concave shape such that when the user places an object on top of the door members 119, the object can slide down the concave shaped surfaces and towards the center vertical axis. Effectively, the parabolic shape of the door members 119 can guide the object to fall towards the vertical centering axis and the object can then be centered as it passes through the isolated top chamber 123.

The pivoting door members 119 can be biased to return to a closed position after an object has passed through the pivoting door members 119. In some embodiments, the pivoting door members 119 can separate from each other and pivot open in a downward direction when an object is placed on top of the pivoting door members 119. In some embodiments, the top of the top chamber 123 can comprise pivoting door members 119 that form an open funnel in a downward direction when the two pivoting members are in an open position. The pivoting door members 119 together can also be form the shape of a cone, or a polygonal cone shape that helps guide the waste downwardly towards the vertical centering axis.

Figure 19:
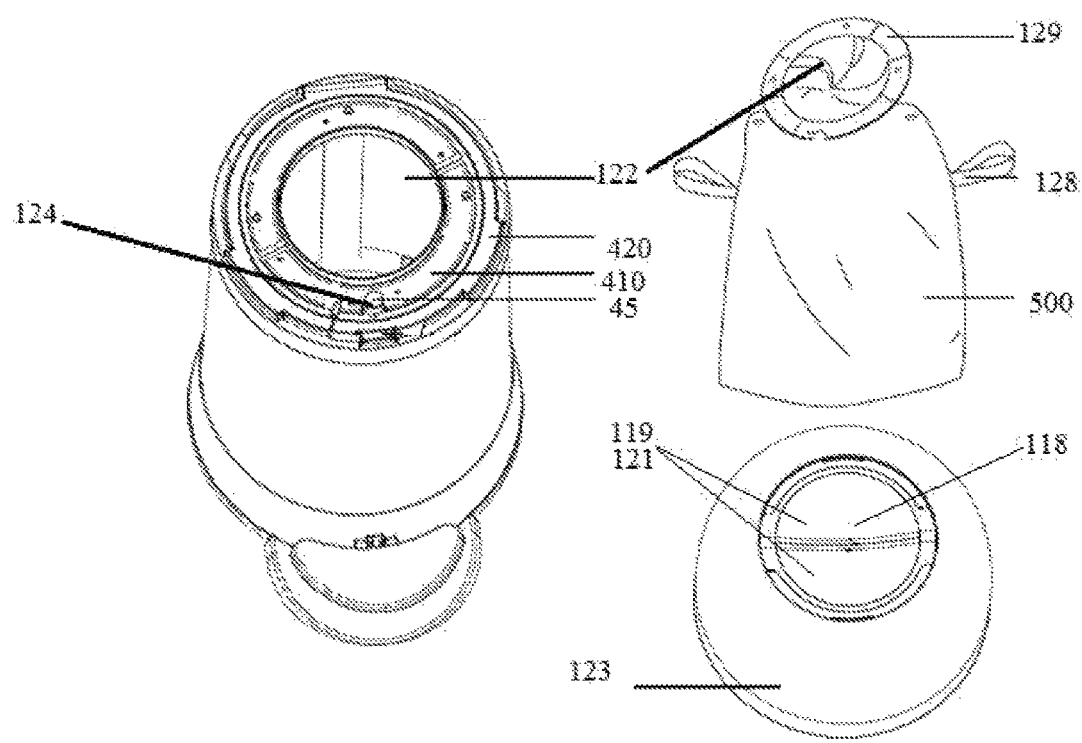
FIG. 19 is a top angled perspective view of the diaper pail of FIG. 17 with the top removed, where the bag assembly is also removed from the frame assembly (the chamber casing is not shown to be transparent).

FIG. 19 depicts a diaper pail with its top chamber 123 removed for better illustration. In the depicted embodiment, the container assembly can have the top chamber 123 completely removed.

Figure 20:
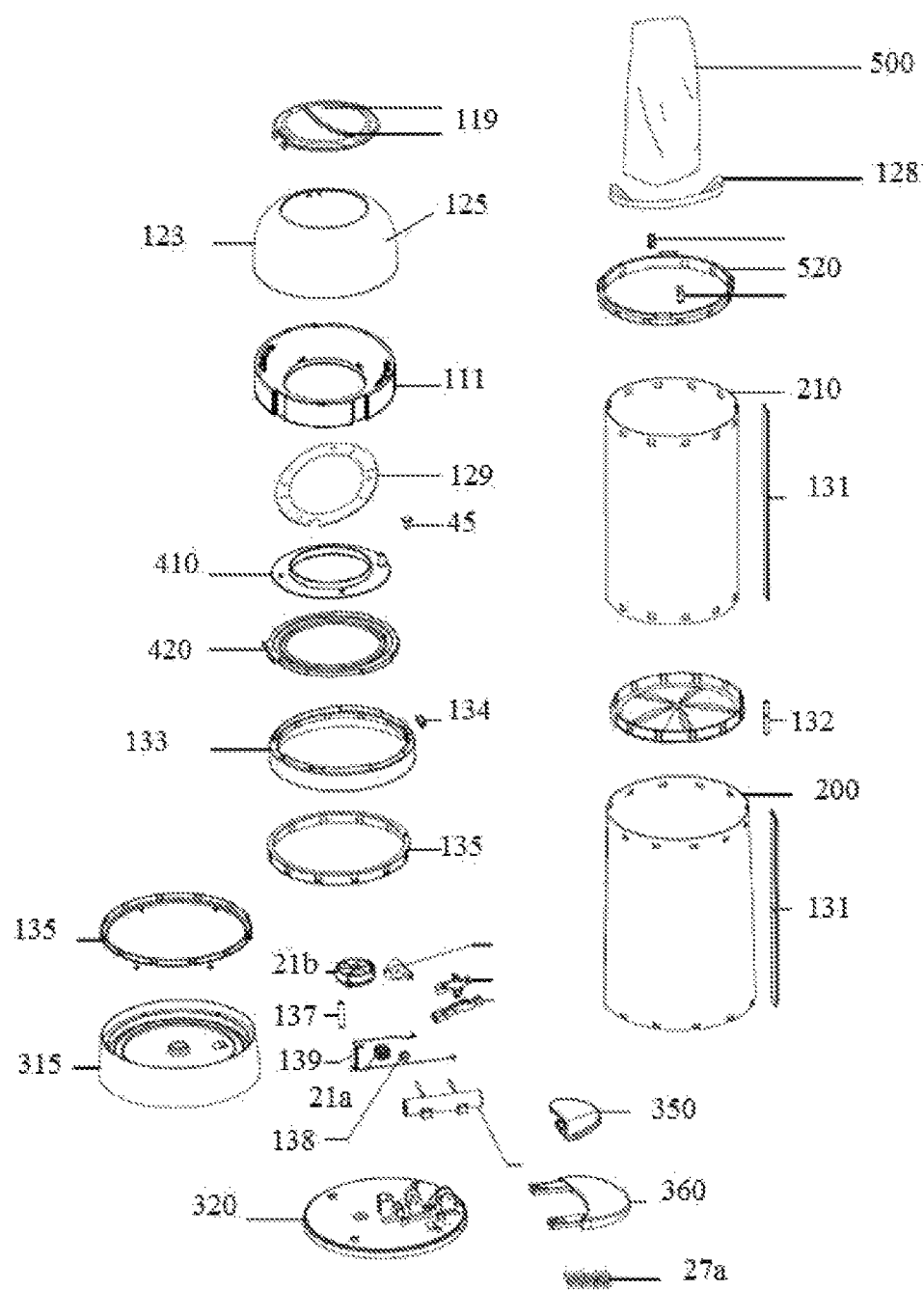
FIG. 20 is an exploded view of all the assembly parts of the embodiment of FIG. 17.
Figure 21:
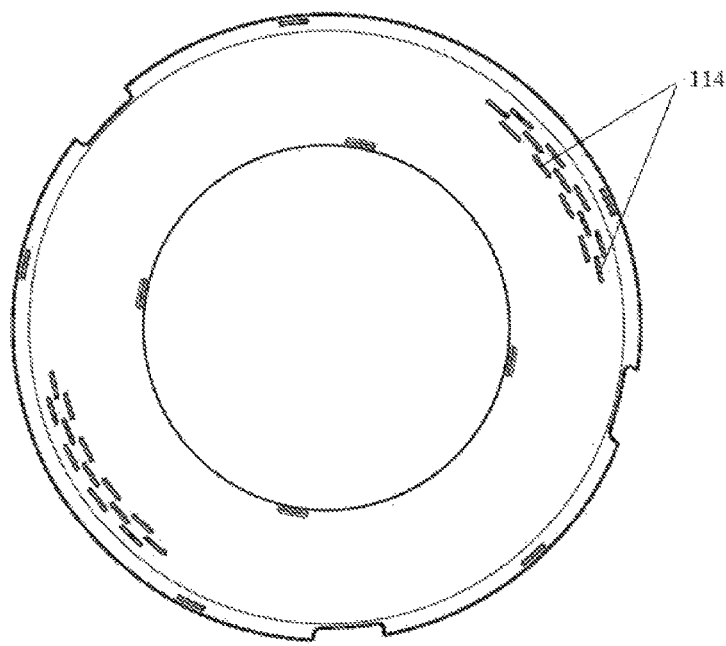
FIG. 21 is a top view of the guiding structure showing the top of the guiding structure cover.

FIG. 20 shows the assortment of the various parts in the diaper pail of FIG. 17. The exploded view features a top chamber 123, pivoting door members 119, and a top chamber casing 125. Shown separately is the guiding structure 111 which can have a cover and a base (as shown in FIGS. 23-24).

In certain embodiments as depicted in FIGS. 20 through 25, the guiding structure 111 can comprise perforations 114 anywhere on the guiding structure 111, or on the downward sloping wall 116 of the guiding structure 111. These perforations can allow air passage into and out of the hollow interior space (see FIG. 25 for hollow interior space 117) of the guiding structure 111. In certain embodiments where the guiding structure 111 is a hollow structure, its hollow interior (see FIG. 25 for hollow interior space 117) can contain deodorizing elements such as activated charcoal, deodorizing liquid holders or pouches with deodorizing elements to neutralize the odor within the top chamber 123. Instead of a deodorizing element, it can also be a scented element and or a sanitizing element. In some embodiments, the deodorizing element can be attached to the outer surface of the guiding structure 111 or to the interior wall of the top chamber 123.

In certain embodiments, the guiding structure 111 can be snapped on, twisted onto or screwed onto either the container assembly, the bag frame 410, the bag frame base 420, or to the top chamber 123. In other embodiments, the guiding structure 111 can be an integral part of any of the container assembly, the bag frame 410, the bag frame base 420, or the top chamber 123.

Figure 22:
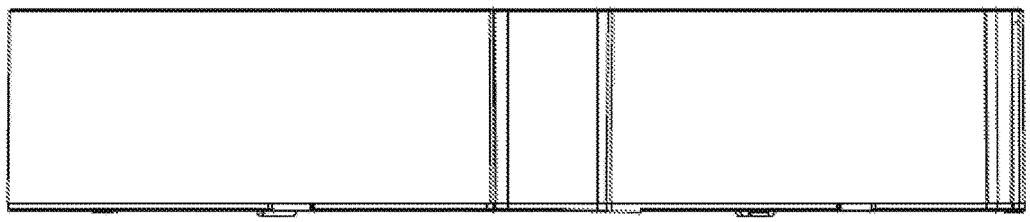
FIG. 22 is a side view of the guiding structure.
Figure 23:
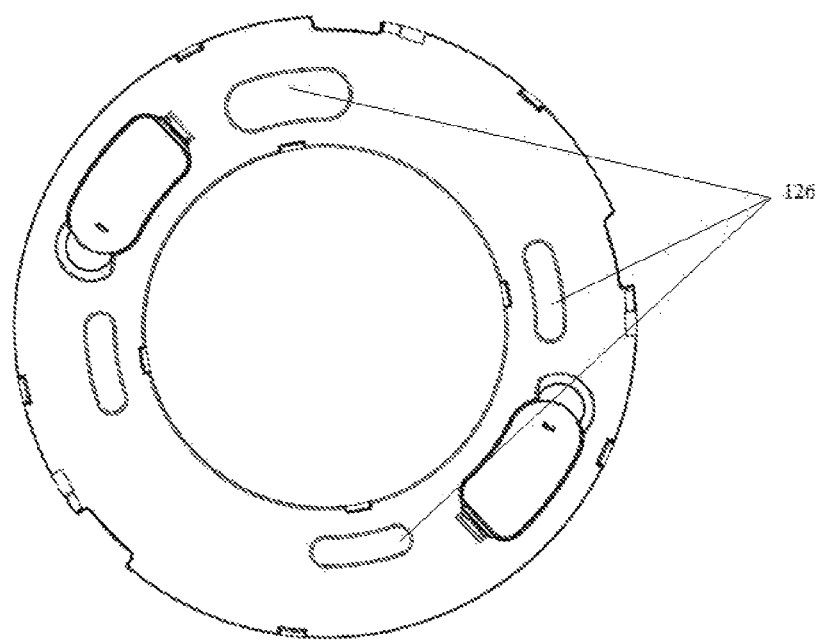
FIG. 23 is a bottom view of the guiding structure showing the guiding structure base.
Figure 24:
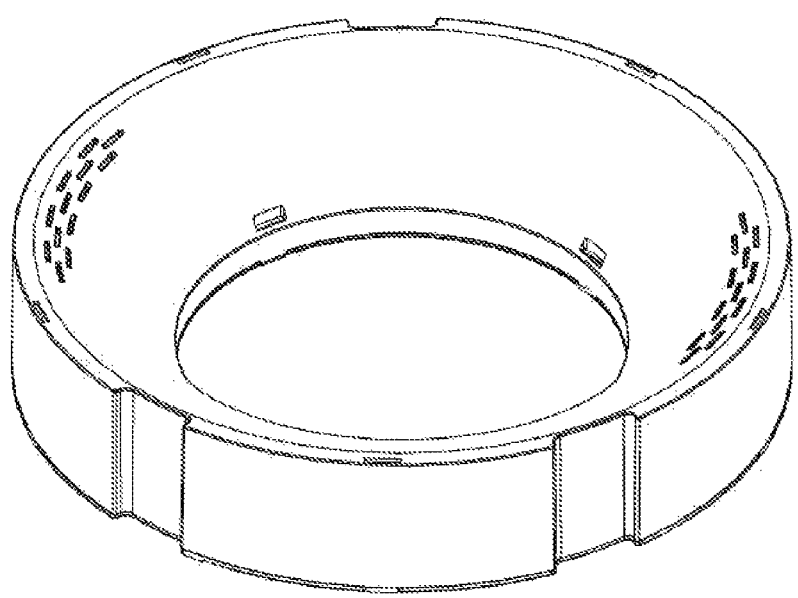
FIG. 24 is a perspective view of the guiding structure showing the guiding structure base and cover.

FIGS. 21 through 25 show various embodiments and views of the guiding structure 111. FIG. 22 shows a side view of guiding structure 111. The guiding structure 111 can be made out of one part or made out of two parts or more parts including a base, a cover, and a chamber to insert deodorizing or other sanitizing elements. FIG. 23 shows the base of a guiding structure with locking holes 126 to lock onto any corresponding structures (e.g., posts) on the bag frame 410 or on the bag frame base 420.

Figure 25:
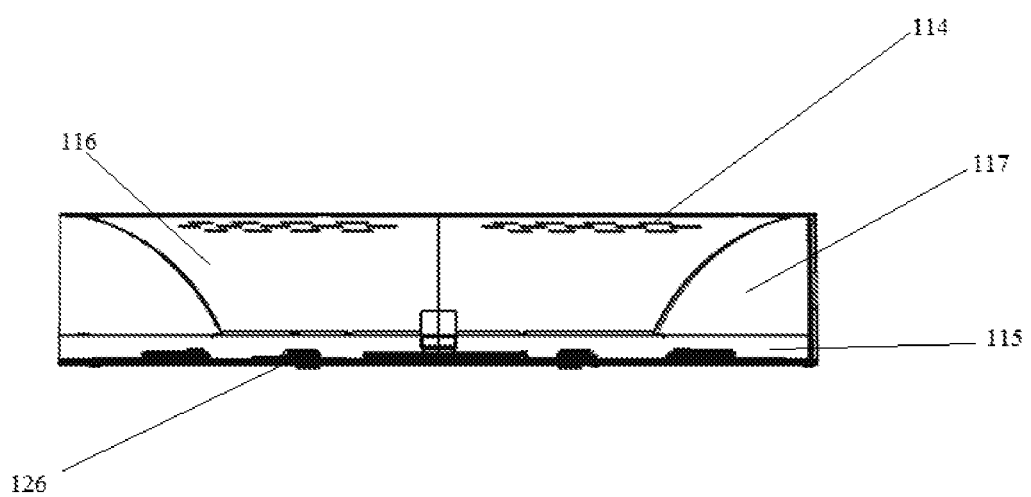
FIG. 25 is a vertical cross-sectional view of one embodiment of the guiding structure having a hollow interior.

In some embodiments as shown in FIG. 25, contemplated guiding structure base 115 (as also shown in FIG. 23) and guiding structure wall 116 (as also shown in FIG. 24) can be attachable to each other. In other embodiments, the guiding structure 111 can be one single structure with only one integral element where the single structure can have perforations to allow for air passage and can have pockets and doors to allow the user to insert deodorizing packets into the inside of the guiding structure 111. The guiding structure 111 can also be one solid element with no perforations 114 or locking holes 126. The guiding structure can also comprise a plurality of elements that all attach together to form a single guiding structure.

Figure 26:
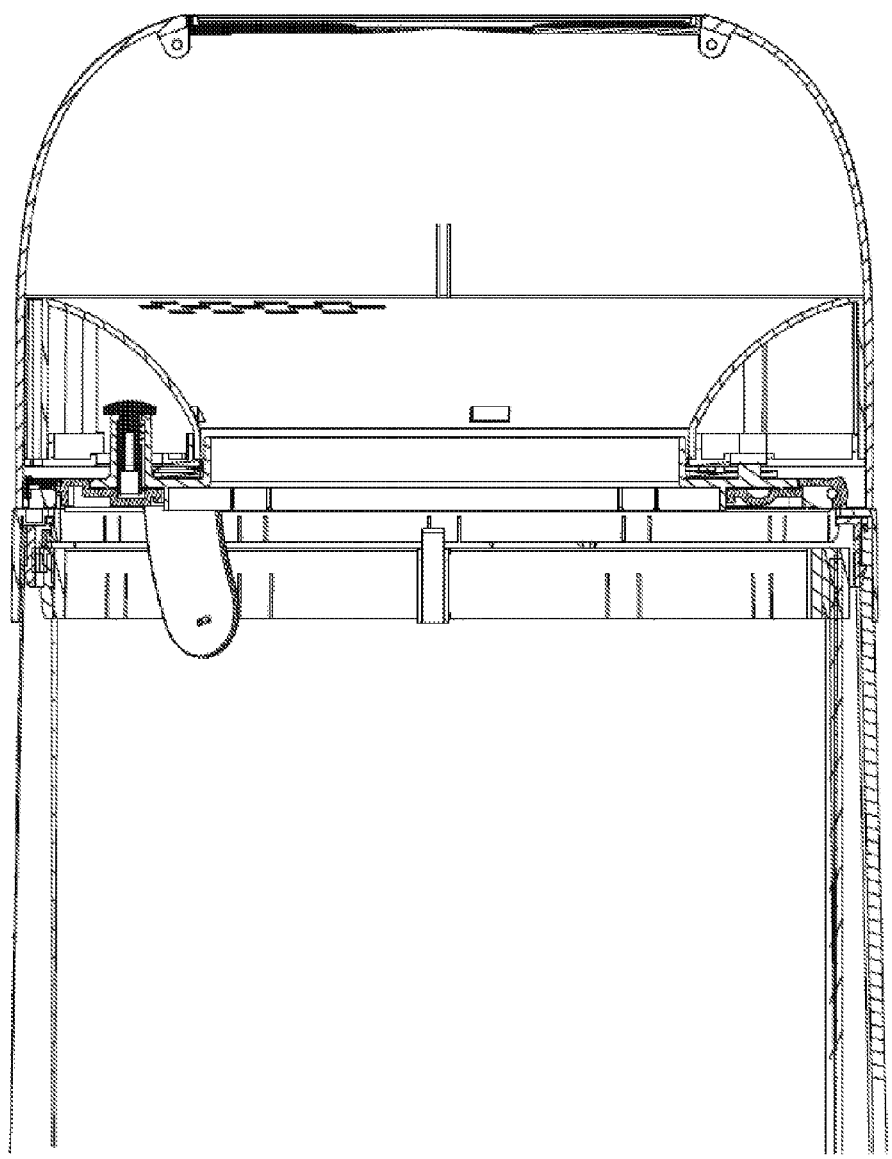
FIG. 26 is an embodiment of a diaper pail illustrating the guiding structure-disposed above the diaper pail collar.

FIG. 26 illustrates the spatial relationships of guiding structure 111 within the top chamber 123.

Figure 27A:
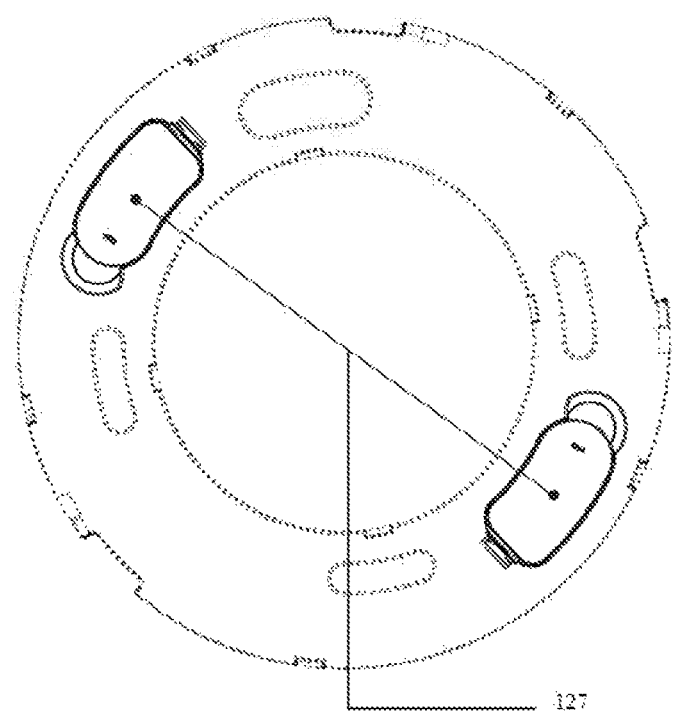
FIG. 27A is a bottom view of one embodiment of the guiding structure with doors to access deodorizing elements. (The deodorizing elements are not shown here).
Figure 27B:
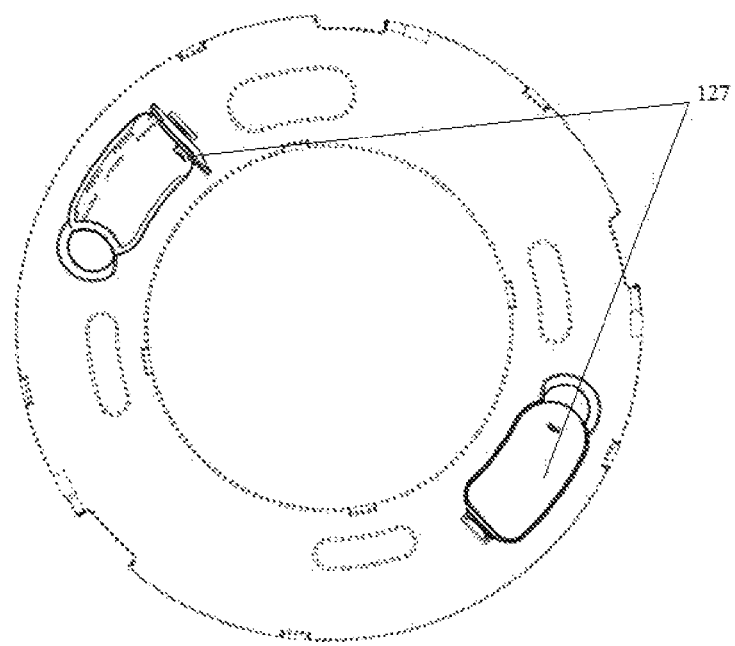
FIG. 27B is another bottom view of the guiding structure with doors to access deodorizing elements. (The deodorizing elements are not shown here).
Figure 27C:
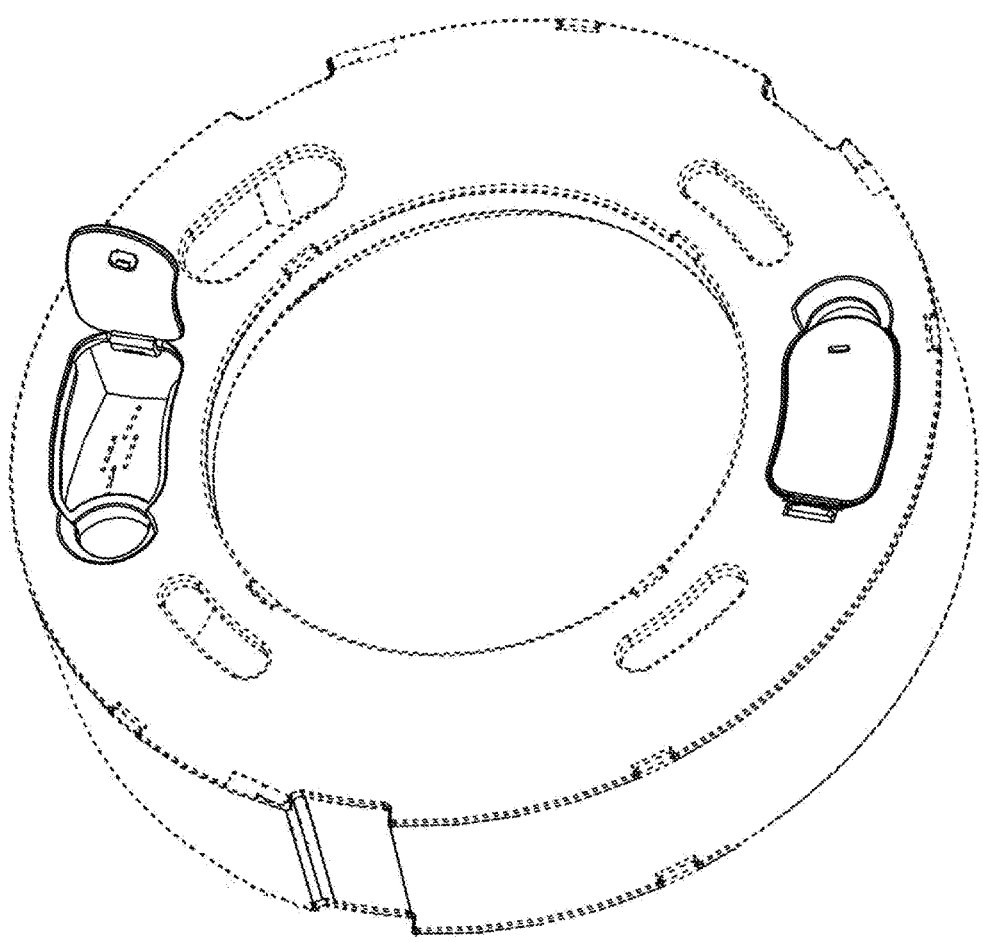
FIG. 27C is another bottom view of the guiding structure with doors to access deodorizing elements. (The deodorizing elements are not shown here).

FIGS. 27A through 27C show compartments with lids 127 that can be opened and through which the user can insert a variety or combination of deodorizing or sanitizing elements (not shown). FIG. 27A shows the base 115 with lids 127 closed. FIGS. 27B and C show one open lid 127 and one closed lid 127. These compartments can be located at the bottom of the guiding structure of can be located along the edges, inner rim or top of the structure.

Figure 28:
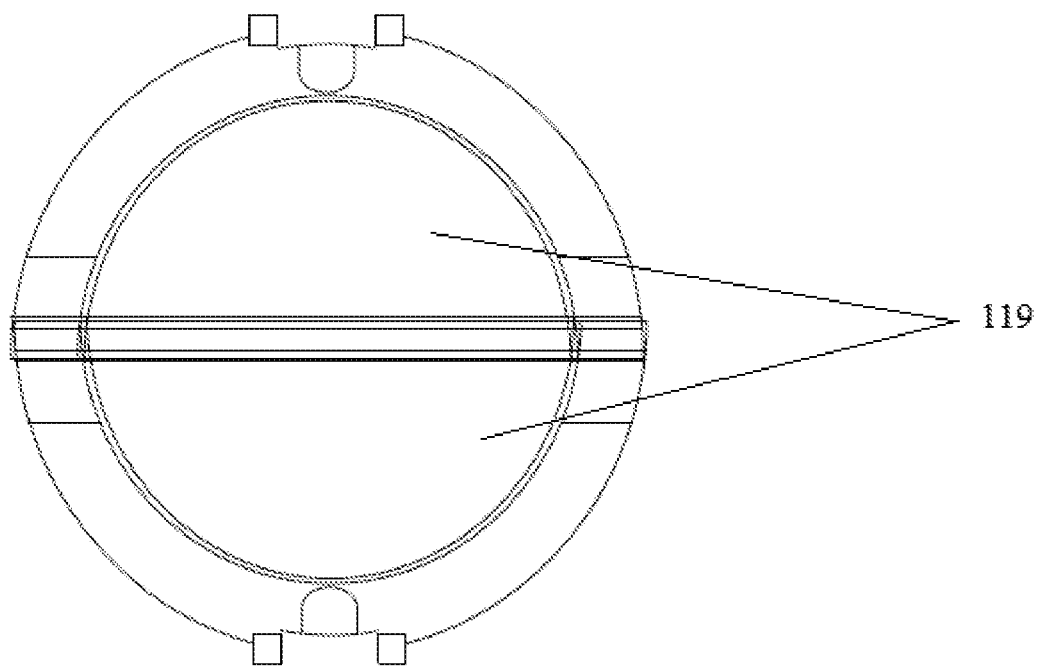
FIG. 28 is a top view of top door members with pivoting elements.
Figure 29:
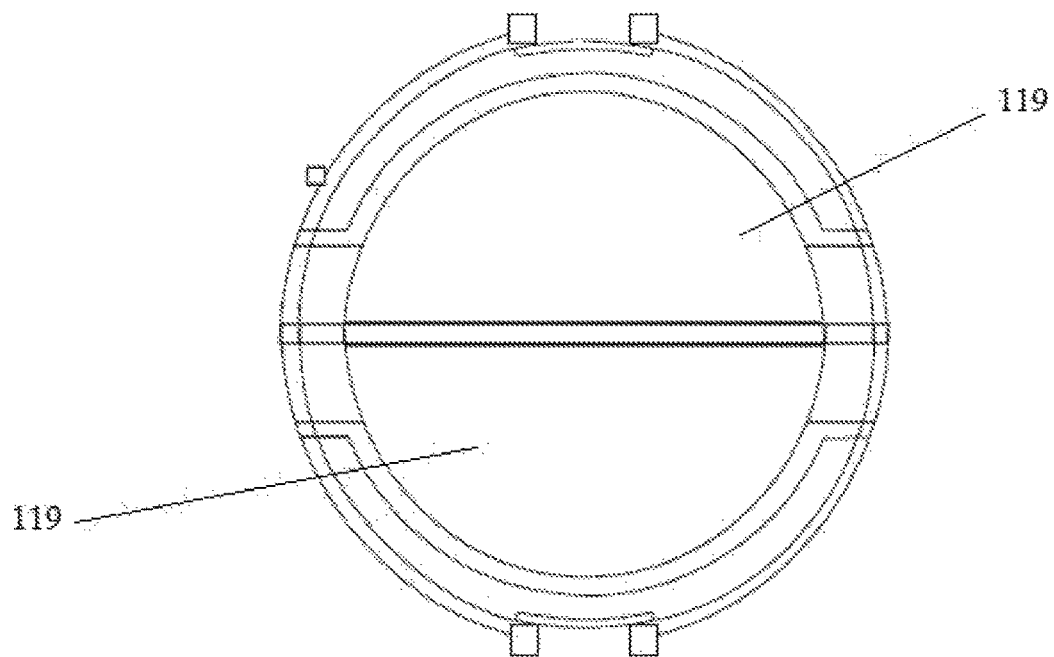
FIG. 29 is a top view of another embodiment of top door members with pivoting elements.
Figure 30:
FIG. 30 illustrates top door members in open and closed positions.
Figure 30:
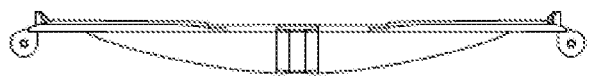
Figure 30:
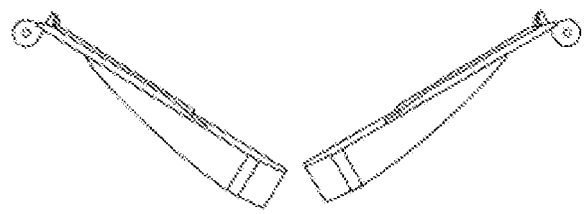
Figure 30:
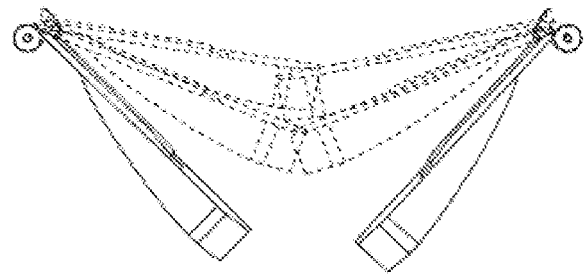
Figure 30:
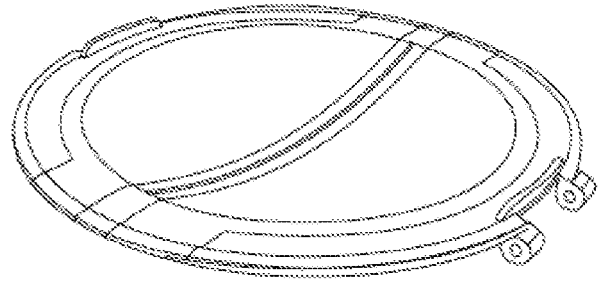
Figure 31:
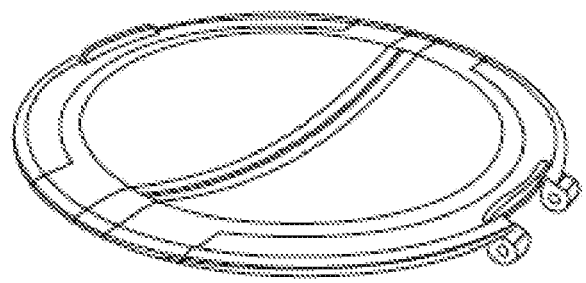
FIG. 31 is another view of top door members in open and closed positions.
Figure 31:
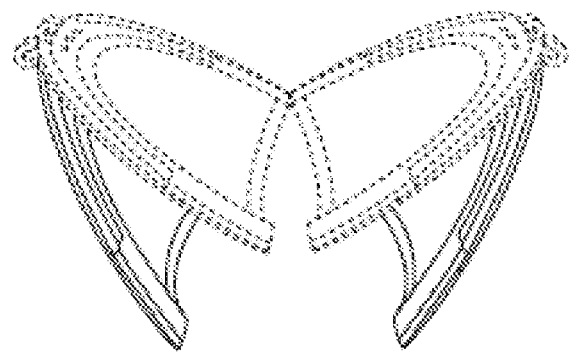
Figure 31:
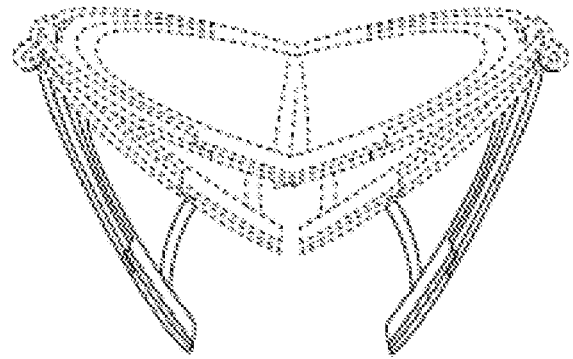

FIGS. 28 and 29 show the top door members 119 that can be attached to the top opening of the top chamber 123 as discussed previously. In this one embodiment, the pivoting door members 119 can be attached to the top chamber via hinges. As discussed previously, the door members can form a concave shape. FIGS. 30 and 31 illustrate how the pivoting door members 119 open downwardly and wherein the parabolic shape facilitates the object to fall towards the center vertical axis. Particular attention should be drawn to the middle figure of FIG. 31. As an object (not shown) causes the door members 119 to begin pivoting downwardly due to the gravitational pull on the object, the curvature of the parabolic shape guides the object towards the center of the parabolic shape. In effect, the object is guided to fall towards the center vertical axis of the waste disposal system.

Figure 32:
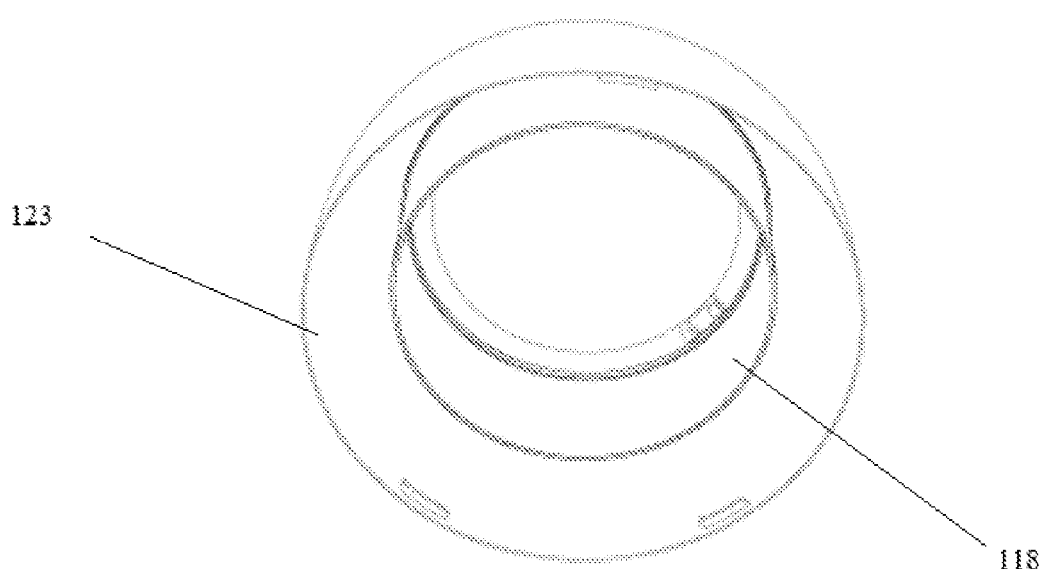
FIG. 32 is bottom perspective view of a top chamber with a chute within it.
Figure 33:
FIG. 33 is a perspective view of a chute embodiment.
Figure 34:
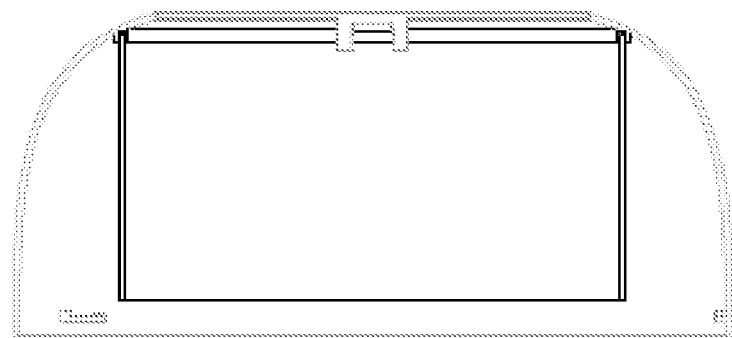
FIG. 34 is side view of a transparent top chamber with a chute inside the top chamber.
Figure 35:
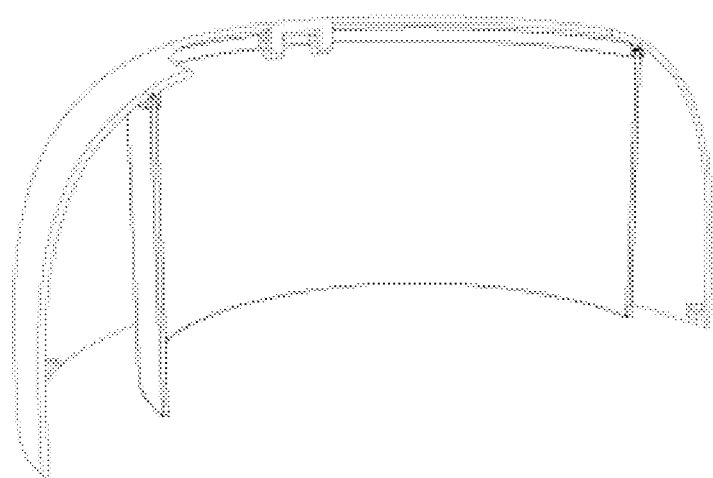
FIG. 35 is a perspective cross sectional view of a top chamber with a chute inside the top chamber.
Figure 36:
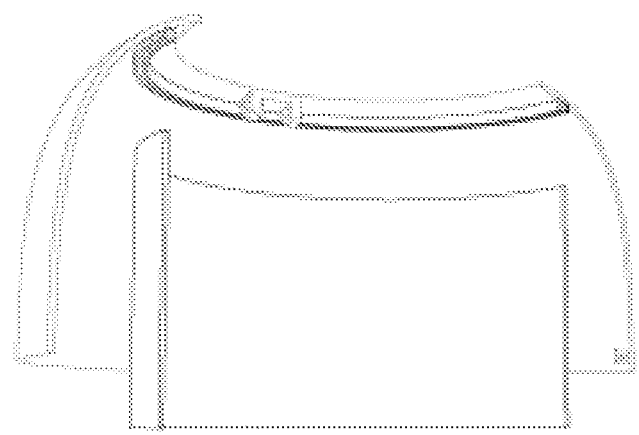
FIG. 36 is a perspective cross sectional view of a top chamber with a chute separated from the top chamber.

FIG. 32 shows a bottom perspective view of a top chamber 123 with a guiding chute 118 disposed inside of the top chamber 123. The chute 118 depicted here is a cylindrical object the walls of which help objects slide down and maintain within a reasonably centering position along a vertical centering axis of the waste disposal system. The chute 118 can be cylindrical as depicted in FIGS. 32 through 36 or triangular, polygonal, funnel shape, conical, frusto-conical, or any other shape that can help guide a falling object down the top chamber 123 in a centering fashion as described. In some embodiments, the chute 118 can be a circular solid wall, but it can also it can be straight, polygonal, with thick hollowed or solid walls. The chute can have perforations; it can extend through the entire container assembly or be only a section of the top chamber. In other words, various heights or lengths of the chute 118 are contemplated. In some embodiments, the chute can be attached to the top chamber 123, or attached to the bag frame 410 or the bag frame base 420. The chute 118 can also be fixed to the waste disposal system or detachably attached to the assembly. In some embodiments, the chute can be snapped on, twisted into or screwed into the assembly.

Thus, specific embodiments and applications of system and apparatus for waste disposal and changing infant-toddler behavior have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the disclosure. In addition, where the specification and claims refer to at least one of something selected from the group consisting of A, B, C . . . and N, the text should be interpreted as requiring only one element from the group, not A plus N, or B plus N, etc.

What is claimed is:

1. A waste disposal system, comprising:
   a container assembly having:
   a base;
   a rotating support structure having an inner volume, and the rotating support structure is rotatably coupled to the base;
   a top chamber having at least one door disposed at a top of the top chamber; and
   a guiding structure disposed within the top chamber, wherein the guiding structure has a downward sloping surface, and wherein the downward sloping surface has a lower rim defining a through hole; and
   wherein the guiding structure includes a base, and a cover attachable to the base.

2. The waste disposal system of claim 1, wherein the guiding structure includes at least one perforation.

3. The waste disposal system of claim 1, wherein the guiding structure can be snapped on, twisted onto or screwed onto the container assembly.

4. The waste disposal system of claim 1, wherein the guiding structure is hollow.

5. The waste disposal system of claim 4 further comprising a deodorizing element or a scented element disposed within the guiding structure.

6. The waste disposal system of claim 1 comprising a chute disposed within the top chamber above the guiding structure.

7. The waste disposal system of claim 1, wherein the at least one door has a two pivoting members, and each pivoting member has a lower portion that is positioned lower than an outer portion of each pivoting member when each pivoting member is in a closed position.

8. The waste disposal system of claim 7, wherein the two pivoting members forms a parabolic shape in a downward direction when the two pivoting members are in a closed position.

9. A waste disposal system, comprising:
   a container assembly having:
   a base;
   a rotating support structure having an inner volume, and the rotating support structure is rotatably coupled to the base;
   a top chamber having a door disposed at a top of the top chamber;
   wherein the door has at least two pivoting members; and
   each pivoting member has a lower portion that is positioned lower than an outer portion of each pivoting member when each pivoting member is in a closed position.

10. The waste disposal system of claim 9, wherein the at least two pivoting members separate from each other and pivot open in a downward direction when an object is disposed on the at least two pivoting members.

11. The waste disposal system of claim 9, wherein the at least two pivoting members form a parabolic shape in a downward direction when the two pivoting members are in a closed position.

12. The waste disposal system of claim 11 further comprising a guiding structure disposed within the top chamber, wherein the guiding structure having a downward sloping surface, and wherein the downward sloping surface has a lower rim defining a through hole.

13. The waste disposal system of claim 12 further comprising a deodorizing element or a scented element disposed within the guiding structure.

14. The waste disposal system of claim 9, wherein the at least two pivoting members form a downward slope toward a center of the door such that when an object is placed on top of any of the two pivoting members in an open position, the object is guided towards the center by gravity.

15. A waste disposal system of claim 9 comprising a chute disposed within the top chamber.

16. A waste disposal system, comprising:
a container assembly having:
 a base;
 a rotating support structure having an inner volume, and the rotating support structure is rotatably coupled to the base;
 a top chamber having a door disposed at a top of the top chamber;
 at least one guiding wall disposed within the top chamber; and
 wherein the door has at least two pivoting members, and each pivoting member has a lower portion that is positioned lower than an outer portion of each pivoting member when each pivoting member is in a closed position.

17. The waste disposal system of claim 16, wherein the at least one guiding wall forms a funnel shape passage.

18. The waste disposal system of claim 16, wherein the at least one guiding wall forms a cylindrical shape passage.

19. The waste disposal system of claim 16 further comprising a guiding structure disposed within the top chamber, wherein the guiding structure having the at least one guiding wall and a downward sloping surface, and wherein the downward sloping surface has a lower rim defining a through hole; and a deodorizing element or a scented element disposed within the top chamber.

20. A waste disposal system, comprising:
an enclosure to hold waste material;
a base;
a rotating support structure to which the enclosure is fastened to, the rotating support structure is rotatably coupled to the base;
a container assembly to contain said enclosure, the container assembly having:
 an isolated top chamber disposed above the enclosure, and the isolated top chamber having a top door; and
 an actuator to control an opening and a closing to an entrance to the enclosure independent of the top door.

21. The waste disposal system as recited in claim 20 further comprising at least one circular guiding wall encircling the entrance, and where the circular guiding wall has an inwardly sloped surface and is disposed within the isolated top chamber.

22. The waste disposal system of claim 20, wherein the isolated top chamber has a casing that includes a transparent or a semi-transparent material.

23. The waste disposal system of claim 20, wherein the top door is transparent, semi-transparent, or translucent.

24. The waste disposal system of claim 20, wherein the at least one guiding wall forms a funnel shape passage encircling the entrance.

25. The waste disposal system of claim 20, wherein the at least one guiding wall forms a cylindrical shape passage encircling the entrance.

26. The waste disposal system of claim 20 further comprising a guiding structure disposed within the top chamber, wherein the guiding structure having a downward sloping surface, and wherein the downward sloping surface has a lower rim defining a through hole; and a deodorizing element or a scented element disposed within the top chamber.

27. The waste disposal system of claim 20, wherein the door has at least two pivoting members, and each pivoting member has a lower portion that is positioned lower than an outer portion of each pivoting member when each pivoting member is in a closed position.

* * * * *